(12) United States Patent
Lee et al.

(10) Patent No.: US 11,108,284 B2
(45) Date of Patent: Aug. 31, 2021

(54) WIRELESS POWER TRANSMITTING DEVICE AND METHOD FOR CONTROLLING THE SAME

(71) Applicant: SAMSUNG ELECTRONICS CO., LTD., Suwon-si (KR)

(72) Inventors: Chong-Min Lee, Seoul (KR);
Kyung-Woo Lee, Seoul (KR);
Sung-Bum Park, Suwon-si (KR);
Jae-Hyun Park, Suwon-si (KR);
Jae-Hyuck Shin, Suwon-si (KR);
Young-Ho Ryu, Yongin-si (KR);
Sang-Wook Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/562,495

(22) Filed: Sep. 6, 2019

(65) Prior Publication Data
US 2019/0393737 A1    Dec. 26, 2019

Related U.S. Application Data

(63) Continuation of application No. 15/474,747, filed on Mar. 30, 2017, now Pat. No. 10,439,450.

(30) Foreign Application Priority Data

Aug. 17, 2016    (KR) .......................... 10-2016-0104119

(51) Int. Cl.
*H02J 50/90*    (2016.01)
*H02J 50/60*    (2016.01)
(Continued)

(52) U.S. Cl.
CPC ............. *H02J 50/90* (2016.02); *G01S 13/42* (2013.01); *H02J 7/025* (2013.01); *H02J 50/20* (2016.02);
(Continued)

(58) Field of Classification Search
CPC .. H02J 50/60; H02J 50/80; H02J 50/90; H02J 7/025; H02J 50/20; H02J 7/0003;
(Continued)

(56) References Cited

U.S. PATENT DOCUMENTS 6,348,070 B1*    2/2002    Teissl ................. A61N 1/36038
                                                      623/11.11
9,966,765 B1*    5/2018    Leabman ................ H02J 50/23
(Continued)

FOREIGN PATENT DOCUMENTS

EP    2 876 772       5/2015
KR    10-1197316    11/2012
(Continued)

OTHER PUBLICATIONS

U.S. Appl. No. 15/474,747, filed Mar. 30, 2017; Lee et al.
(Continued)

*Primary Examiner* — Jared Fureman
*Assistant Examiner* — Esayas G Yeshaw
(74) *Attorney, Agent, or Firm* — Nixon & Vanderhye P.C.

(57)    ABSTRACT

A wireless power transmitting device is provided. The wireless power transmitting device may comprise an antenna, a memory, and a processor configured to control to store, as reference information, information of a first reflected signal of a pilot signal sent out through the antenna at a first time in the memory and control to compare the reference information with information about second reflected signals of a pilot signal sent out through the
(Continued)

antenna at a second time, and determine a position of a target for detection based on a result of the comparison.

20 Claims, 28 Drawing Sheets

Related U.S. Application Data

(60) Provisional application No. 62/315,869, filed on Mar. 31, 2016.

(51) Int. Cl.
| | |
|---|---|
| *H02J 50/80* | (2016.01) |
| *H02J 50/20* | (2016.01) |
| *G01S 13/42* | (2006.01) |
| *H02J 7/02* | (2016.01) |
| *H04L 5/00* | (2006.01) |
| *H04W 8/00* | (2009.01) |
| *G01S 7/41* | (2006.01) |

(52) U.S. Cl.
CPC .............. *H02J 50/60* (2016.02); *H02J 50/80* (2016.02); *H04L 5/0048* (2013.01); *H04W 8/005* (2013.01); *G01S 7/411* (2013.01); *H04L 5/0023* (2013.01)

(58) Field of Classification Search
CPC ........ G01S 7/411; G01S 13/42; H04L 5/0048; H04L 5/0023; H04W 8/005
See application file for complete search history.

(56) References Cited

U.S. PATENT DOCUMENTS

| | | | | | |
|---|---|---|---|---|---|
| 2004/0142733 | A1* | 7/2004 | Parise | ..................... | H02J 50/27 455/572 |
| 2008/0192509 | A1* | 8/2008 | Dhuyvetter | ....... | H02M 3/33523 363/17 |
| 2010/0284208 | A1* | 11/2010 | Nguyen | .............. | H02M 7/4807 363/160 |
| 2011/0304217 | A1* | 12/2011 | Yamamoto | .............. | B60L 53/12 307/104 |
| 2012/0161538 | A1* | 6/2012 | Kinoshita | ................ | H02J 50/12 307/104 |
| 2013/0063047 | A1 | 3/2013 | Veskovic | | |
| 2013/0288595 | A1* | 10/2013 | Lee | .......................... | H01F 38/14 455/39 |
| 2014/0159651 | A1 | 6/2014 | Von Novak | | |
| 2014/0327323 | A1 | 11/2014 | Masaoka et al. | | |
| 2015/0102685 | A1* | 4/2015 | Blood | ..................... | H02J 7/025 307/104 |
| 2015/0123496 | A1 | 5/2015 | Leabman et al. | | |
| 2015/0207333 | A1* | 7/2015 | Baarman | ................. | H02J 50/12 307/104 |
| 2016/0118836 | A1* | 4/2016 | Waldschmidt | .......... | H02J 7/025 320/108 |
| 2016/0254705 | A1 | 9/2016 | Jung et al. | | |
| 2017/0066336 | A1 | 3/2017 | Okamoto | | |
| 2017/0085112 | A1 | 3/2017 | Leabman | | |
| 2017/0179726 | A1* | 6/2017 | Garrity | ................. | H02J 7/0045 |
| 2017/0317529 | A1 | 11/2017 | Smith | | |
| 2019/0329653 | A1* | 10/2019 | Ueta | ..................... | B60K 37/02 |

FOREIGN PATENT DOCUMENTS

| | | |
|---|---|---|
| KR | 10-2013-0065009 | 6/2013 |
| KR | 10-1372472 | 3/2014 |
| KR | 10-2014-0095411 | 8/2014 |
| KR | 10-2014-0101839 | 8/2014 |
| KR | 10-2015-0049858 | 5/2015 |
| WO | WO 2015/020683 | 2/2015 |
| WO | WO 2015/128941 | 9/2015 |

OTHER PUBLICATIONS

U.S. Appl. No. 62/315,869, filed Mar. 31, 2016; Lee et al.
Search Report and Written Opinion dated Jul. 10, 2017 in counterpart International Patent Application No. PCT/KR2017/003493.
Extended Search Report dated Nov. 22, 2018 in counterpart European Patent Application No. 17775859.6.

\* cited by examiner

WIRELESS POWER TRANSMITTING DEVICE AND METHOD FOR CONTROLLING THE SAME

CROSS-REFERENCE TO RELATED APPLICATIONS

This application is a Continuation of U.S. application Ser. No. 15/474,747, filed Mar. 30, 2017, which claims benefit of U.S. Provisional Ser. No. 62/315,869, filed Mar. 31, 2016, all of which claim priority to KR 10-2016-0104119, filed Aug. 17, 2016, the entire contents of each of which are all hereby incorporated herein by reference.

TECHNICAL FIELD

The present disclosure relates generally to wireless power transmitting devices and methods for controlling the same, and for example, to wireless power transmitting devices capable of wirelessly transmitting power to electronic devices and methods for controlling the same.

DISCUSSION OF RELATED ART

Portable digital communication devices have become must-have items for modern people. Customers desire to receive various high-quality services anytime, anywhere. Internet of Thing (IoT) technology recently bundles various sensors, home appliances, and communication devices up into a single network. A diversity of sensors require a wireless power transmission system for seamless operations.

Wireless power transmission may come in various types, such as magnetic induction, magnetic resonance, and electromagnetic waves, among which the electromagnetic wave type may advantageously work for a few meters of remote power transmission as compared with the others.

Such electromagnetic wave type is primarily intended for remote power transmission and may precisely determine the location of remote power receivers and deliver power in a most efficient way.

In order to determine the position of a target for charging, e.g., an electronic device, a conventional electromagnetic wave scheme forms radio frequency (RF) waves in multiple directions, receives power-related information from the electronic device, and uses the received information to determine the position of the electronic device. However, the formation of RF waves in multiple directions and the reception of power-related information take a significant amount of time. In such case, it is not secured to fix the electronic device to one position. In particular, harm to human bodies raises the issue that high-power transmission is impossible before detecting a target for charging.

The above information is presented as background information only to assist with an understanding of the present disclosure.

SUMMARY

In situations in which the user carries or puts on a small electronic device, the electronic device may be subject to frequent changes in position. Accordingly, a quick determination as to the position of the electronic device is a matter for efficient wireless charging. The present disclosure addresses the above issues. According to an example embodiment of the present disclosure, a wireless power transmitting device capable of swiftly determining the position of an electronic device by sending out pilot signals in multiple directions and analyzing reflections thereof and a method for controlling the same are provided. A wireless power transmitting device capable of conducting wireless charging by avoiding obstacles positioned between an electronic device and the wireless power transmitting device and a method for controlling the same is also provided.

According to an example embodiment of the present disclosure, a wireless power transmitting device may comprise an antenna, a memory, and a processor configured to control to store, as reference information, information about a first reflected signal of a pilot signal sent out through the antenna at a first time in the memory, control to compare the reference information with information about second reflected signals of a pilot signal sent out through the antenna at a second time, and determine a position of a target for detection based on a result of the comparison.

According to an example embodiment of the present disclosure, a method for controlling a wireless power transmitting device may comprise storing, as reference information, information about a first reflected signal of a pilot signal sent out at a first time, sending out a pilot signal at a second time, and comparing the reference information with information about second reflected signals of the pilot signal sent out at the second time; and determining a position of a target for detection based on a result of the comparison.

According to an example embodiment of the present disclosure, a wireless power transmitting device may comprise a plurality of antennas, a communication circuit, and a processor configured to control to receive, through the communication circuit, a first communication signal from a first antenna of an electronic device, and to receive, through the communication circuit, a second communication signal from a second antenna of the electronic device, and determine whether an obstacle is positioned between the electronic device and the wireless power transmitting device based on a first time of reception of the first communication signal and a second time of reception of the second communication signal, and upon determining that the obstacle is positioned between the electronic device and the wireless power transmitting device, control to transmit, through the plurality of antennas, power to the electronic device while avoiding the obstacle.

According to an example embodiment of the present disclosure, a method for controlling a wireless power transmitting device may comprise receiving a first communication signal from a first antenna of an electronic device, receiving a second communication signal from a second antenna of the electronic device, determining whether an obstacle is positioned between the electronic device and the wireless power transmitting device based on a first time of reception of the first communication signal and a second time of reception of the second communication signal, and upon determining that the obstacle is positioned between the electronic device and the wireless power transmitting device, transmitting power to the electronic device while avoiding the obstacle.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS to the above and other aspects, features and attendant advantages of the present disclosure will be apparent and more readily appreciated from the following detailed description, taken in conjunction with the accompanying drawings, in which like reference numerals refer to like elements, and wherein.

Throughout the drawings, like reference numerals will be understood to refer to like parts, components, and structures.

DETAILED DESCRIPTION

Figure 1:
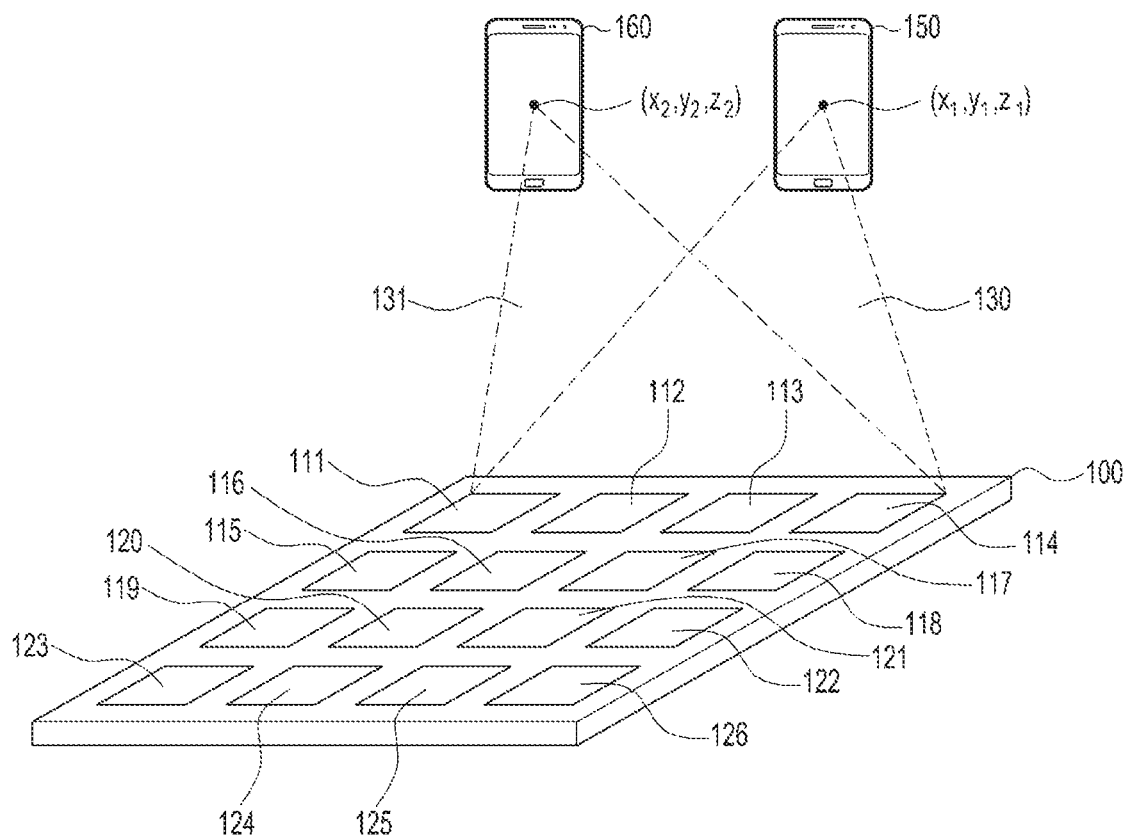
FIG. 1 is a diagram illustrating an example wireless power transmission system according to an example embodiment of the present disclosure.

Hereinafter, various example embodiments of the present disclosure are described with reference to the accompanying drawings. However, it should be appreciated that the present disclosure is not limited to the example embodiments and the terminology used herein, and all changes and/or equivalents or replacements thereto also belong to the scope of the present disclosure. The same or similar reference denotations may be used to refer to the same or similar elements throughout the disclosure and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software or a combination thereof in the context. Rather, the term "configured to" may mean that a device can perform an operation together with another device or parts. For example, the term "processor configured (or set) to perform A, B, and C" may refer to a generic-purpose processor (e.g., a CPU or application processor) that may perform the operations by executing one or more software programs stored in a memory device or a dedicated processor (e.g., an embedded processor) for performing the operations.

For example, examples of the wireless power transmitting device or electronic device according to various example embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device, or the like, but are not limited thereto. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device, or the like, but is not limited thereto. In some example embodiments, examples of the wireless power transmitting device or electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, or an electronic picture frame, or the like, but is not limited thereto.

According to an example embodiment of the present disclosure, examples of the wireless power transmitting device or electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler), or the like, but is not limited thereto. According to various example embodiments of the disclosure, examples of the wireless power transmitting device or electronic device may at least one of part of a piece of furniture, building/structure or vehicle, an electronic board, an electronic signature receiving device, a projector, or various measurement devices (e.g., devices for measuring water, electricity, gas, or electromagnetic waves), or the like, but are not limited thereto. According to example embodiments of the present disclosure, the wireless power transmitting device or electronic device may be flexible or may be a combination of the above-enumerated electronic devices. According to an example embodiment of the present disclosure, the wireless power transmitting device or electronic device is not limited to the above-listed embodiments. As used herein, the term "user" may refer to a human using the electronic device or another device (e.g., an artificial intelligent electronic device) using the wireless power transmitting device or electronic device.

FIG. 1 is a diagram illustrating an example wireless power transmission system according to an example embodiment of the present disclosure.

The wireless power transmitting device 100 may wirelessly transmit power to at least one electronic device 150 or 160. According to an embodiment of the present disclosure, the wireless power transmitting device 100 may include a plurality of patch antennas 111 to 126. The patch antennas 111 to 126 are not limited as long as they each are an antenna capable of generating RF waves. At least one of the amplitude and phase of RF waves generated by the patch antennas 111 to 126 may be adjusted by the wireless power transmitting device 100. For ease of description, the RF wave generated by single patch antenna may be referred to as sub-RF waves.

According to an example embodiment of the present disclosure, the wireless power transmitting device 100 may adjust at least one of the amplitude and phase of each of the sub-RF waves generated by the patch antennas 111 to 126 respectively. Meanwhile, the sub-RF waves may interfere with each other. For example, the sub-RF waves may constructively interfere with each other at one point or destructively interfere with each other at another point. According to an embodiment of the present disclosure, the wireless power transmitting device 100 may adjust at least one of the amplitude and phase of each of the sub-RF waves generated by the patch antennas 111 to 126 so that the sub-RF waves may constructively interfere with each other at a first point (x1, y1, z1).

For example, the wireless power transmitting device 100 may determine that an electronic device 150 is positioned at the first point (x1, y1, z1). Here, the position of the electronic device 150 may be the position where, e.g., a power receiving antenna of the electronic device 150 is located. A method for determining the position of the electronic device 150 is described below in greater detail. In order for the electronic device 150 to wirelessly receive power at a higher transmission efficiency, the sub-RF waves should constructively interfere with each other at the first point (x1, y1, z1). Accordingly, the wireless power transmitting device 100 may control the patch antennas 111 to 126 so that the sub-RF waves may constructively interfere with each other at the first point (x1, y1, z1). For example, controlling the patch antennas 111 to 126 may refer, for example, to controlling the magnitude of signals input to the patch antennas 111 to 126 or controlling the phase (or delay) of signals input to the patch antennas 111 to 126. Meanwhile, beamforming, a technique for controlling RF waves to be subject to constructive interference at a certain point, would readily be appreciated by one of ordinary skill in the art. It is also appreciated by one of ordinary skill in the art that the beamforming used herein is not particularly limited in type. For example, various beamforming methods may be adopted as disclosed in U.S. Patent Application Publication No. 2016/0099611, U.S. Patent Application Publication No. 2016/0099755, and U.S. Patent Application Publication No. 2016/0100124. An RF wave formed by beamforming may be referred to, for example, as a pocket of energy.

An RF wave 130 formed by the sub-RF waves may have the maximum and/or substantially large amplitude at the first point (x1, y1, z1), and thus, the electronic device 150 may receive power at a higher efficiency. Meanwhile, the wireless power transmitting device 100 may detect that an electronic device 160 is positioned at a second point (x2, y2, z2). The wireless power transmitting device 100 may control the patch antennas 111 to 126 so that the sub-RF waves may constructively interfere with each other at the second point (x2, y2, z2) to charge the electronic device 160. An RF wave 131 formed by the sub-RF waves may have the maximum and/or substantially large amplitude at the second point (x2, y2, z2), and thus, the electronic device 160 may receive power at a higher efficiency.

For example, the electronic device 150 may be positioned relatively at a right side. In this case, the wireless power transmitting device 100 may apply a relatively larger delay to sub-RF waves formed by the patch antennas (e.g., 114, 118, 122, and 126) positioned relatively at a right side. In other words, a predetermined time after the sub-RF waves are formed by patch antennas (e.g., 111, 115, 119, and 123) positioned relatively at a left side, sub-RF waves may be generated by the patch antennas (e.g., 114, 118, 122, and 126) positioned relatively at a right side. Thus, the sub-RF waves may simultaneously meet at a relatively right-side point. In other words, the sub-RF waves may constructively interfere with each other at the relatively right-side point. Where beamforming is conducted at a relatively middle point, the wireless power transmitting device 100 may apply substantially the same delay to the left-side patch antennas (e.g., 111, 115, 119, and 123) and the right-side patch antennas (e.g., 114, 118, 122, and 126). Further, where beamforming is conducted at a relatively left-side point, the wireless power transmitting device 100 may apply a larger delay to the left-side patch antennas (e.g., 111, 115, 119, and 123) than to the right-side patch antennas (e.g., 114, 118, 122, and 126). Meanwhile, according to an example embodiment of the present disclosure, the wireless power transmitting device 100 may substantially simultaneously generate sub-RF waves through all of the patch antennas 111 to 126 and may perform beamforming by, for example, adjusting the phase corresponding to the above-described delay.

As set forth above, the wireless power transmitting device 100 may determine the position of the electronic devices 150 and 160 and enable the sub-RF waves to constructively interfere with each other at the determined position, allowing for wireless charging at a higher transmission efficiency. Meanwhile, the wireless power transmitting device 100 may be capable of high-transmission efficiency wireless charging when it can more precisely determine the position of the electronic devices 150 and 160.

Figure 2:
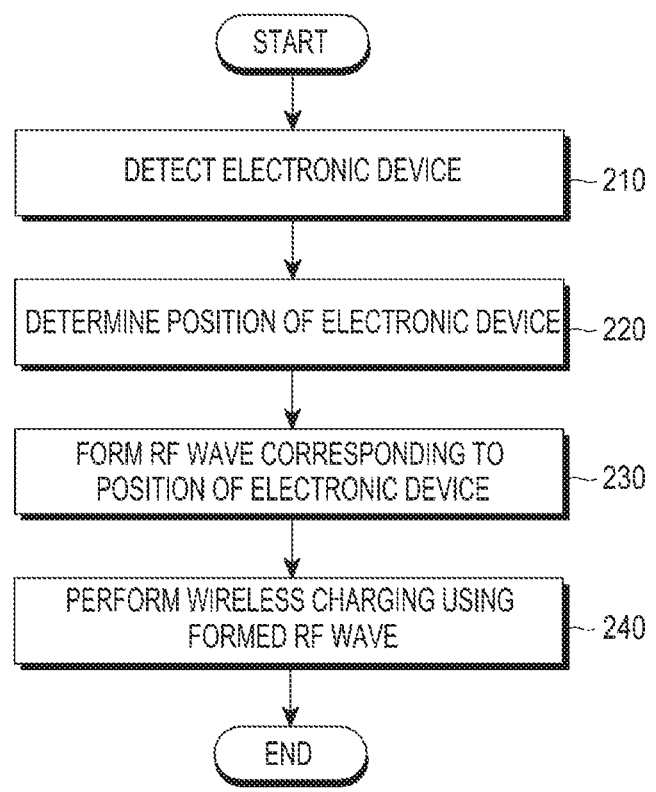
FIG. 2 is a flowchart illustrating an example method for controlling a wireless power transmitting device according to an example embodiment of the present disclosure.

FIG. 2 is a flowchart illustrating an example method for controlling a wireless power transmitting device according to an example embodiment of the present disclosure. Hereinafter, the wireless power transmitting device performs a particular operation may refer, for example, to a situation in which a processor of the wireless power transmitting device performs a particular operation or the processor controls other hardware units to perform a particular operation. Further, the wireless power transmitting device stores particular information may refer, for example, to a situation in which a memory in the wireless power transmitting device stores particular information.

In operation 210, the wireless power transmitting device may detect an electronic device. According to an example embodiment of the present disclosure, the wireless power transmitting device may send out pilot signals in multiple directions. The wireless power transmitting device may receive reflected signals of the pilot signals. The wireless power transmitting device may previously store, as reference information, information about a reflected signal, e.g., a signal characteristic, e.g., at least one of the amplitude, phase, and time of flight of the reflected signal. Accordingly, the wireless power transmitting device may store a signal characteristic corresponding to the area where the wireless power transmitting device is positioned. Where an additional object, similar to the electronic device, is positioned, the signal characteristic may become different than before. The wireless power transmitting device may send out pilot signals in multiple directions and may compare the characteristic of a reflected signal with pre-stored reference information. When there is a difference between the reflected signal and the reference information, the wireless power transmitting device may detect the electronic device. Meanwhile, the wireless power transmitting device may determine whether a target for detection is the electronic device or an obstacle, which is described below in greater detail.

In operation 220, the wireless power transmitting device may determine the position of the electronic device. According to an example embodiment of the present disclosure, the wireless power transmitting device may determine the direction in which the electronic device is positioned. A configuration in which the wireless power transmitting device determines the position of the electronic device or the direction in which the electronic device is positioned is described below in greater detail.

In operation 230, the wireless power transmitting device may form a RF wave corresponding to the position of the electronic device. According to an example embodiment of the present disclosure, the wireless power transmitting device may form a RF wave in the direction along which the electronic device is positioned. Here, the wireless power transmitting device forms a RF wave in the direction along which the electronic device is positioned may refer, for example, to controlling at least one of the phase and amplitude of each of patch antennas so that sub-RF waves may constructively interfere with each other at one or more points where the electronic device is positioned. For example, the wireless power transmitting device may control at least one phase shifter included or connected to the power transmission antenna array to form a RF wave in a particular direction. For example, the wireless power transmitting device may control each gain of at least one power amplifier included or connected to the power transmission antenna array to form a RF wave in a particular direction.

The wireless power transmitting device may receive, from the electronic device, RX (receive) power-related information that the electronic device has received, and accordingly, the wireless power transmitting device may continue or maintain forming the RF wave or adjust and reform the RF wave. For example, when the received power-related information meets a preset condition, the wireless power transmitting device may continue forming the RF wave. Unless the received power-related information meets the preset condition, the wireless power transmitting device may reform the RF wave by adjusting the magnitude of power applied to the patch antennas. In other words, the wireless power transmitting device may adjust the RF wave until the received power-related information received from the electronic device meets the preset condition. According to an example embodiment of the present disclosure, the wireless power transmitting device may directly determine the position of the electronic device. In this case, the wireless power transmitting device may control at least one of the phase and amplitude of each of the patch antennas so that the sub-RF waves constructively interfere with each other at the position of the electronic device. In operation 240, the wireless power transmitting device may conduct wireless charging using the formed RF wave.

Figure 3:
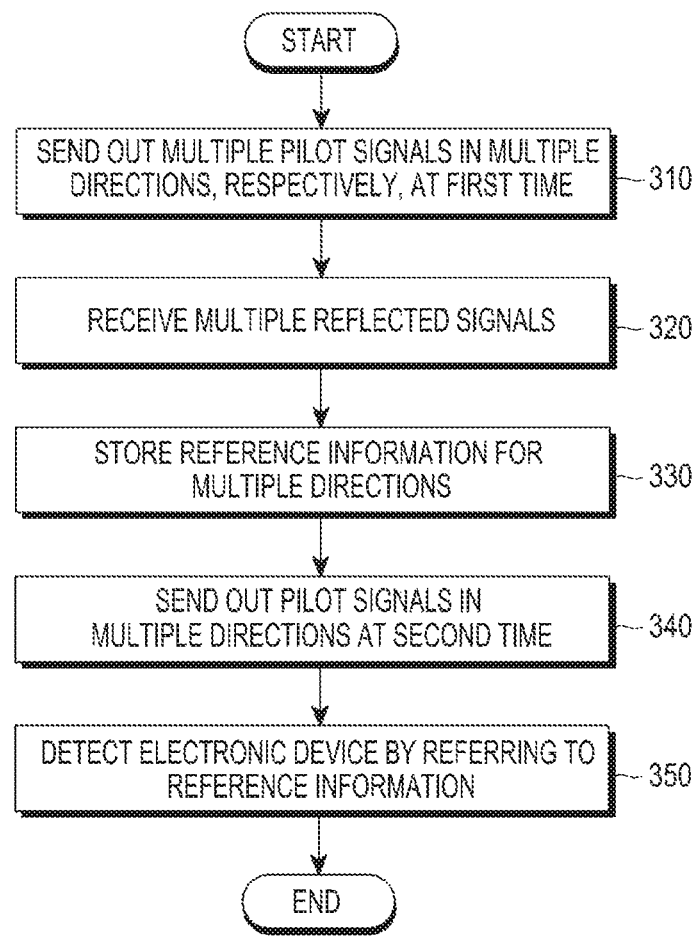
FIG. 3 is a flowchart illustrating an example method for controlling a wireless power transmitting device according to an example embodiment of the present disclosure.
Figure 4A:
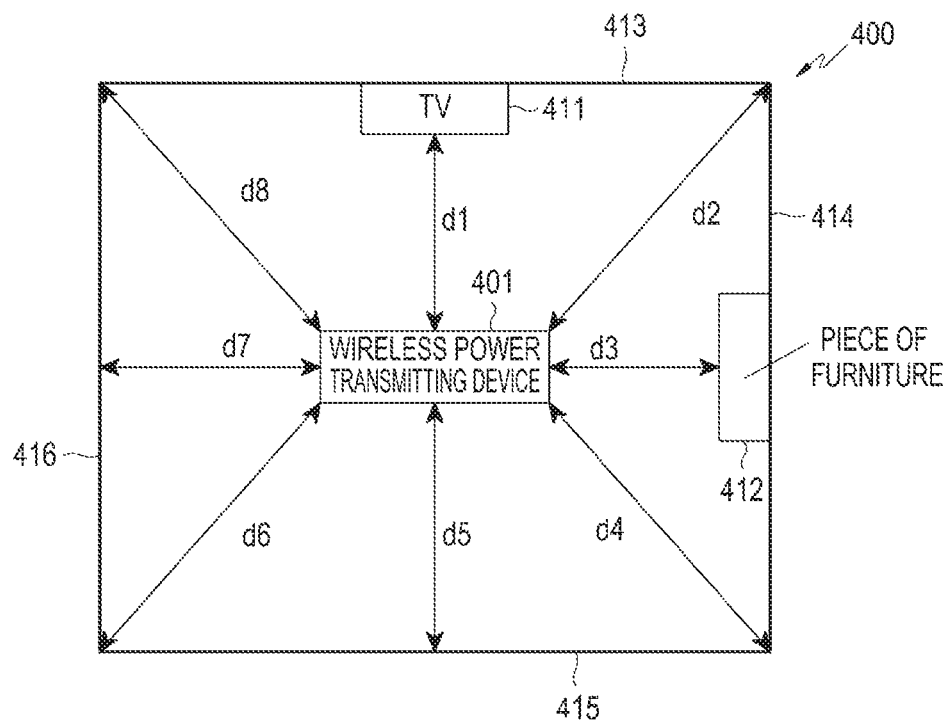
FIGS. 4A, 4B and 4C are plan views illustrating a particular area where a wireless power transmitting device is positioned according to an example embodiment of the present disclosure.
Figure 4B:
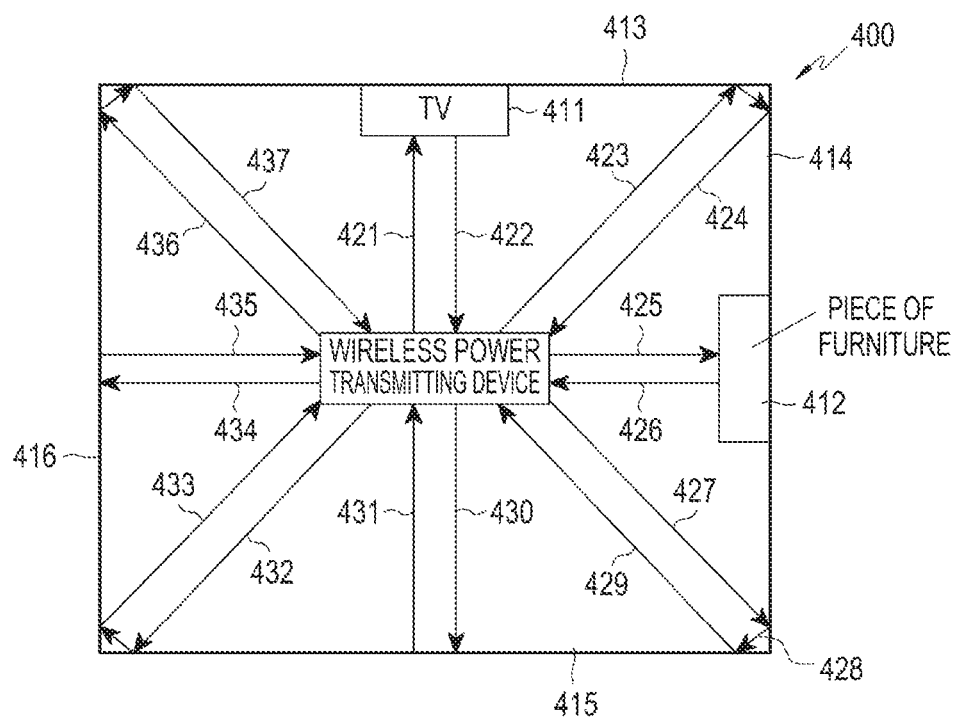
Figure 4C:
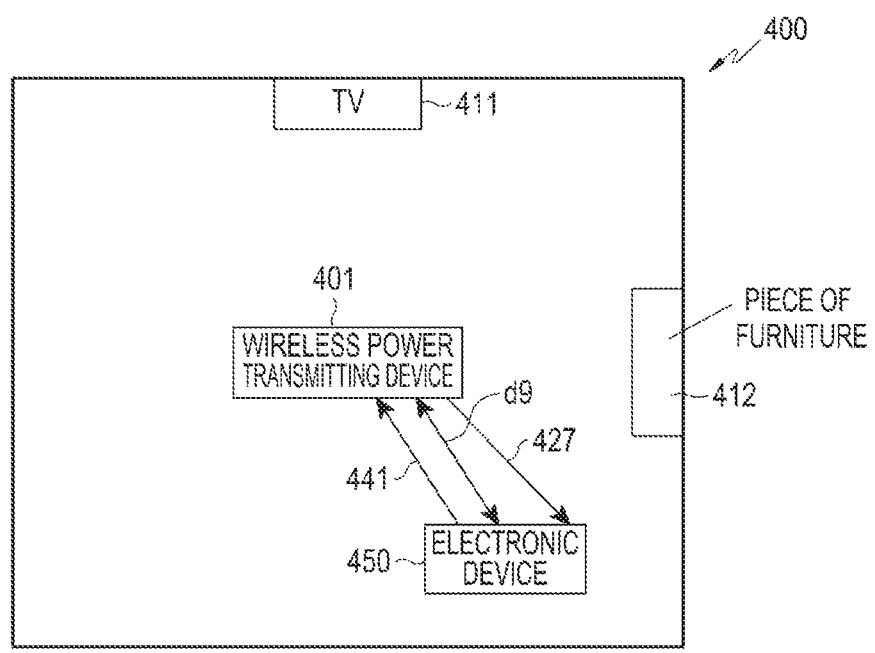

FIG. 3 is a flowchart illustrating an example method for controlling a wireless power transmitting device according to an example embodiment of the present disclosure. The embodiment illustrated in FIG. 3 is described in further detail with reference to FIGS. 4A, 4B and 4C. FIGS. 4A, 4B and 4C are plan views illustrating a particular area where a wireless power transmitting device is positioned according to an example embodiment of the present disclosure.

The wireless power transmitting device 401 may be positioned at the center of a particular area 400 as illustrated in, e.g., FIG. 4A. The particular area 400 may include four walls 413, 414, 415, and 416 constituting a room. A television (TV) 411 may be positioned at an upper side of the particular area 400, and a piece of furniture 412 may be positioned at a right side. The distance between the wireless power transmitting device 401 and the TV 411 may be d1, and the distance between the wireless power transmitting device 401 and the piece of furniture 412 may be d3. Further, the distance between the wireless power transmitting device 401 and the walls 413, 414, 415, and 416 may be d2 or d4 to d8 depending on directions.

Referring to FIG. 3, the wireless power transmitting device 401 may send out pilot signals in a plurality of directions at a first time in operation 310. For example, as illustrated in FIG. 4B, the wireless power transmitting device 401 may send out pilot signals 421, 423, 425, 427, 430, 432, 434, and 436, respectively, in first to eighth directions. According to an example embodiment of the present disclosure, the wireless power transmitting device 401 may send out each of the pilot signals 421, 423, 425, 427, 430, 432, 434, and 436 at one time. In this case, the wireless power transmitting device 401 may insert identification information into each pilot signal 421, 423, 425, 427, 430, 432, 434, and 436 and send out them. Or, the wireless power transmitting device 401 may send out each pilot signal 421, 423, 425, 427, 430, 432, 434, and 436 at a different frequency. Or, the wireless power transmitting device 401 may send out each pilot signal 421, 423, 425, 427, 430, 432, 434, and 436 in order of time.

In operation 320, the wireless power transmitting device 401 may receive a plurality of reflected signals. For example, as illustrated in FIG. 4b, a first pilot signal 421 may be sent out from the wireless power transmitting device 401 and may then be reflected by the TV 411. Accordingly, the reflected signal 422 may be received by the wireless power transmitting device 401. As compared with the pilot signal 421 sent out, the reflected signal 422 may have at least one of its phase and amplitude varied. Further, the wireless power transmitting device 401 may determine the time of flight which is a difference between the time of transmission of the pilot signal 421 and the time of reception of the reflected signal 422.

Meanwhile, the wireless power transmitting device 401 may receive a signal 429 that is generated as the pilot signal 427 is first reflected (428) by one wall 414 and is second reflected (429) by another wall 415. As described above, the wireless power transmitting device 401 may receive reflected signals 422, 424, 426, 429, 431, 433, 435, and 437 respectively corresponding to the pilot signals 421, 423, 425, 427, 430, 432, 434, and 436 sent out. The wireless power transmitting device 401 may determine whether the reflected signals 422, 424, 426, 429, 431, 433, 435, and 437 respectively correspond to the pilot signals 421, 423, 425, 427, 430, 432, 434, and 436, based on at least one of the identification information and frequency. Or, the wireless power transmitting device 401 may determine whether the reflected signals 422, 424, 426, 429, 431, 433, 435, and 437 respectively correspond to the pilot signals 421, 423, 425, 427, 430, 432, 434, and 436, according to time divisions.

In operation 330, the wireless power transmitting device 401 may store reference information for a plurality of directions. For example, the wireless power transmitting device 401 may store reference information as shown in Table 1.

TABLE 1

| Direction | Amplitude attenuation (dB) | Phase change (rad) | Time of flight (μs) |
| --- | --- | --- | --- |
| First direction | −2 | +13 | 0.12 |
| Second direction | −4 | −2 | 0.24 |
| Third direction | −3 | +17 | 0.15 |
| Fourth direction | −4.1 | −3 | 0.28 |

As set forth above, the reference information may include information about at least one of the amplitude, phase, and time of flight. However, it will be appreciated by one of ordinary skill in the art that the reference information is not limited as long as it is information indicating the characteristic of a signal, such as radar cross section (RCS). It will also be appreciated by one of ordinary skill in the art that the wireless power transmitting device 401 may determine the characteristic of a signal using various signal processing methods, such as AM-AM noise, AM-PM noise, or IQ signaling. IQ signaling is primarily used in signal modulation/demodulation schemes, such as phase-shift keying (PSK), code division multiple access (CDMA), wideband CDMA (WCDMA), or orthogonal frequency division multiplexing (OFDM). PSK may be able to more exactly determine distorted information using a modulation scheme, such as binary PSK (BPSK), quadrature PSK (QPSK), or 8PSK. Accordingly, robustness can be secured for correction of diversity due to multi-path reflection, which is described below in greater detail with reference to FIG. 8.

Meanwhile, the wireless power transmitting device 401 may share the reference information as shown in Table 1 with another wireless power transmitting device or another electronic device. Having received the reference information, the electronic device may correct the reference information considering its relative position and a relative position of the wireless power transmitting device 401 and may use the corrected reference information.

Meanwhile, according to an example embodiment of the present disclosure, the wireless power transmitting device 401 may receive reference information from another electronic device. For example, another electronic device processing the transmission of a radio pilot signal and the signal characteristic of a reflected wave may be implemented separately from the wireless power transmitting device 401. In this case, the other electronic device may generate reference information, such as that shown in, e.g., Table 1, and transfer the reference information to the wireless power transmitting device 401. In this case, the other electronic device may continue to process the transmission of the pilot signal and signal characteristic of the reflected signal, and when a variation in the reflected wave signal characteristic occurs, it may deliver information about the direction in which the variation occurs to the wireless power transmitting device 401. The wireless power transmitting device 401 may correct the direction information received from the other electronic device with respect to the wireless power transmitting device 401 and use the corrected information. According to an embodiment of the present disclosure, the other electronic device may also detect an obstacle or the electronic device using the signal characteristic of the reflected signal. According to an embodiment of the present disclosure, the other electronic device may transfer only the signal characteristic of the reflected wave to the wireless power transmitting device 401, and the wireless power transmitting device 401 may detect the obstacle or electronic device using the signal characteristic of the reflected wave received from the other electronic device.

The wireless power transmitting device 401 may compare the amplitude of a pilot signal 421 in a first direction with the amplitude of a reflected signal 422 corresponding to the pilot signal 421 to determine an amplitude attenuation. The wireless power transmitting device 401 may compare the phase of the pilot signal 421 in the first direction with the phase of the reflected signal 422 corresponding to the pilot signal 421 to determine a phase variation. The wireless power transmitting device 401 may determine a time of flight using a difference between the time of transmission of the pilot signal 421 in the first direction and the time of reception of the reflected signal 422 corresponding to the pilot signal 421.

In operation 340, the wireless power transmitting device 401 may send out pilot signals in a plurality of directions at a second time. For example, the electronic device 450 may be positioned in an area 400 at the second time as illustrated in FIG. 4C. The electronic device 450 may be positioned at a distance d9 in a fourth direction with respect to the wireless power transmitting device 401. The wireless power transmitting device 401 may send out a pilot signal 427 in the fourth direction. Although the other pilot signals 421, 423, 425, 430, 432, 434, and 436 are not shown for ease of description, the wireless power transmitting device 401 may send out the pilot signals 421, 423, 425, 427, 430, 432, 434, and 436 in a plurality of directions as illustrated in FIG. 4B. Meanwhile, the reflection 441 of the pilot signal 427 by the electronic device 450 may be received by the wireless power transmitting device 401. The wireless power transmitting device 401 may determine the characteristic of the reflected signal 441. In operation 350, the wireless power transmitting device 401 may detect the electronic device 450 for wireless charging by referring to reference information. For example, the reference information in the fourth direction as shown in Table 1 may be subject to a signal attenuation of −4.1 dB, a phase variation of −3 rad, and a time of flight of 0.28 μs. Meanwhile, the wireless power transmitting device 401 may determine that the reflected signal 444 at the second time is subject to a signal attenuation of −1.2 dB, a phase variation of 40 rad, and a time of flight of 0.12 μs, as compared with the pilot signal 427. In other words, the wireless power transmitting device 401 may identify detection of a difference of 2.9 dB for signal attenuation, a difference of 43 rad for phase variation, and a difference of 0.16 μs for time of flight. Upon determining that the difference in characteristic between the reference information and the reflected signal exceeds a threshold, the wireless power transmitting device 401 may determine that the electronic device 450 is positioned in the corresponding direction. According to an embodiment of the present disclosure, the wireless power transmitting device 401 may perform comparison with a threshold set for each factor with each difference in signal attenuation, phase variation, and time of flight, or the wireless power transmitting device 401 may conduct, using a sum of weights, comparison with a threshold set corresponding thereto. According to an embodiment of the present disclosure, upon detecting a difference exceeding the threshold, the wireless power transmitting device 401 may determine that an obstacle, not the electronic device 450, is positioned in the corresponding direction. In other words, the electronic device 450 may determine whether an object detected in the corresponding direction is the electronic device or the obstacle, which is described below in greater detail.

Meanwhile, according to an embodiment of the present disclosure, the wireless power transmitting device 401 may use only reflected signals having a time of flight within a preset threshold in generating reference information or detecting the electronic device 450. Although not shown, the pilot signal may be received by the wireless power transmitting device 401 after undergoing multiple times of reflection. The signal having undergone the multiple times of reflection may have a relatively large time of flight or a relatively large degree of attenuation, and accordingly, it may not reflect the actual topography of the area 400. Therefore, the wireless power transmitting device 401 may use only reflected signals having a time of flight within a preset threshold in generating reference information or detecting the electronic device 450. Or, the wireless power transmitting device 401 may carry out generation of reference information or detection of the electronic device 450 using various conventional reflection correcting methods (e.g., diversity correcting methods).

Figure 5:
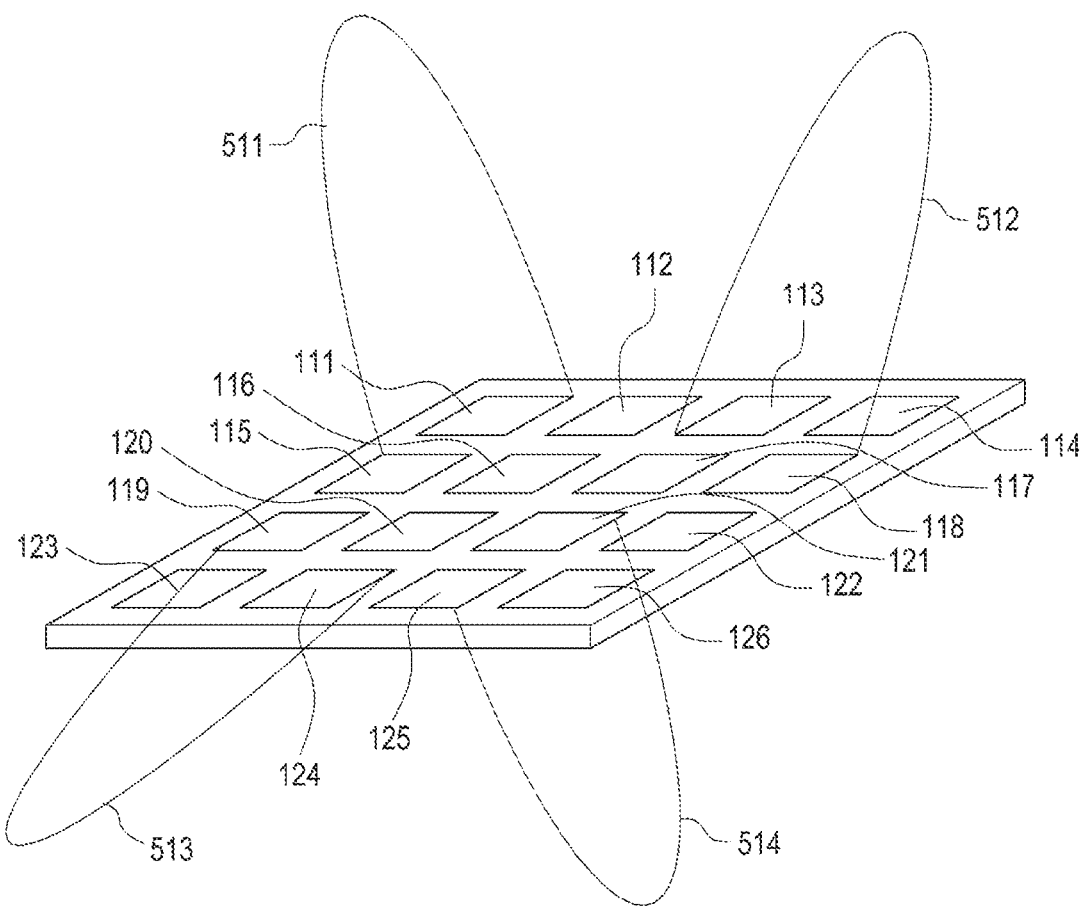
FIG. 5 is a diagram illustrating example transmission of a pilot signal according to an example embodiment of the present disclosure.

FIG. 5 is diagram illustrating example transmission of a pilot signal according to an example embodiment of the present disclosure. As illustrated in FIG. 5, the wireless power transmitting device may perform pilot signal transmission using some of a plurality of patch antennas so that sub-RF waves are formed in a single direction. For example, some patch antennas 111, 112, 115, and 116 may form a sub-RF wave 511 in a first direction, some patch antennas 113, 114, 117, and 118 may form a sub-RF wave 512 in a second direction, some patch antennas 119, 120, 123, and 124 may form a sub-RF wave 513 in a third direction, and other patch antennas 121, 122, 125, and 126 may form a sub-RF wave 514 in a fourth direction.

Figure 6:
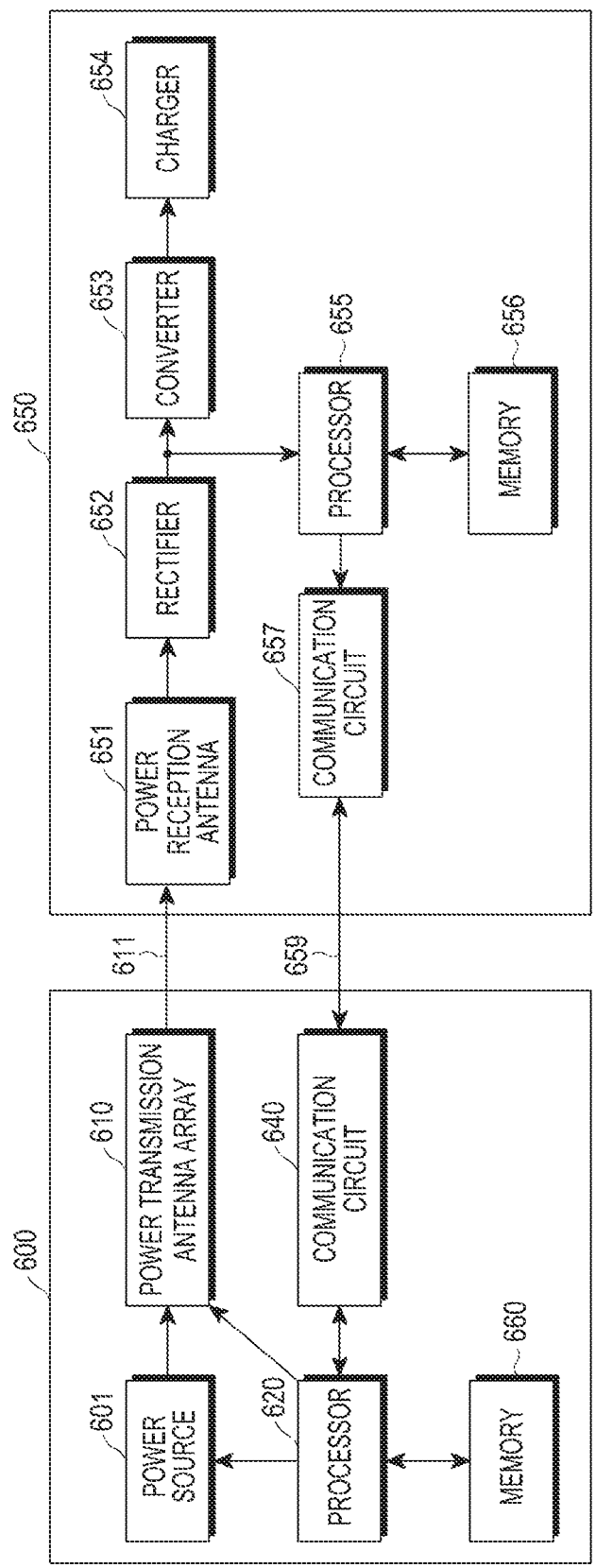
FIG. 6 is a block diagram illustrating an example wireless power transmitting device according to an example embodiment of the present disclosure.

FIG. 6 is a block diagram illustrating an example wireless power transmitting device according to an example embodiment of the present disclosure.

A wireless power transmitting device 600 may include a power source 601, a power transmission antenna array (or an antenna array for power transmission) 610, a processor (e.g., including processing circuitry) 620, a memory 660, and a communication circuit 640. An electronic device 650 is not limited as long as it is a device capable of wirelessly receiving power and may include a power reception antenna (or an antenna for power reception) 651, a rectifier 652, a converter 653, a charger 654, a processor (e.g., including processing circuitry) 655, a memory 656, and a communication circuit 657.

The power source 601 may provide power for transmission to the power transmission antenna array 610. The power source 601 may provide, e.g., direct current (DC) power, in which case the wireless power transmitting device 600 may further include an inverter (not shown) that converts DC power into alternating current (AC) power and delivers the AC power to the power transmission antenna array 610. Meanwhile, according to an embodiment of the present disclosure, the power source 601 may provide AC power to the power transmission antenna array 610.

The power transmission antenna array 610 may include a plurality of patch antennas. For example, a plurality of patch antennas as illustrated in FIG. 1 may be included in the power transmission antenna array 610. The number or array form of the plurality of patch antennas is not limited. The power transmission antenna array 610 may form a RF wave using the power received from the power source 601. The power transmission antenna array 610 may form a RF wave in a particular direction under the control of the processor 620. Here, forming a RF wave in a particular direction may refer, for example, to controlling at least one of the amplitude and phase of sub-RF waves so that the sub-RF waves constructively interfere with each other at a point in the particular direction. The processor 620 may control the power transmission array antenna 610 to form sub-RF waves, e.g., pilot signals, in a plurality of directions, respectively. The memory 630 may store a program or algorithm that generates the sub-RF waves, e.g., pilot signals, in the plurality of directions, respectively. The processor 620 may control at least one of the phase and amplitude of each patch antenna of the power transmission array antenna 610 using the program or algorithm stored in the memory 630.

The processor 620 may control the wireless power transmitting device 600 so that the sub-RF waves, e.g., pilot signals, are formed during a first period. The processor 620 may control the patch antennas of the power transmission array antenna 610 to receive reflected signals during a second period after the first period. As set forth above, the patch antennas may receive reflected signals, and the processor 620 may determine which pilot signal each reflected signal corresponds to. The processor 620 may determine the signal characteristic of each reflected signal. The processor 620 may store information, e.g., signal characteristic, about each reflected signal, as reference information, in the memory 630. The processor 620 may control the wireless power transmitting device 600 so that the sub-RF waves, e.g., pilot signals, are formed during a detection period. For example, the wireless power transmitting device 600 may be configured to conduct transmission of a pilot signal and reception of a reflected signal during the detection period to detect a target for detection to be charged. Further, the wireless power transmitting device 600 may charge a detected electronic device during a charging period.

The processor 620 may control the patch antennas of the power transmission array antenna 610 to receive reflected signals. The processor 620 may determine the signal characteristic of each reflected signal. The processor 620 may compare the signal characteristic of each reflected signal with reference information. The processor 620 may determine at least one of the direction and position of the target for detection based on a result of the comparison. The processor 620 may identify whether the target for detection is the electronic device 650 capable of wireless charging or an obstacle incapable of wireless charging. For example, the processor 620 may identify whether the target is the electronic device 650 or the obstacle depending on whether the communication circuit 640 receives a communication signal 659 from the communication circuit 657 of the electronic device 650. The processor 620 may perform wireless charging on the electronic device 650. Further, the processor 620 may reflect the detected target on the reference information. The electronic device 650 may send out a communication signal 659 through the communication circuit 657 as it receives a pilot signal. The pilot signal may have as high a magnitude as it can wake up at least the communication circuit 657 or the communication 657 and the processor 655.

The processor 620 may determine the direction in which the electronic device 650 is positioned and determine the direction of formation of the RF wave based on the determined direction. In other words, the processor 620 may control the patch antennas of the power transmission array antenna 610 that generates sub-RF waves so that the sub-RF waves constructively interfere with each other at one point in the determined direction. For example, the processor 620 may control at least one of the amplitude and phase of the sub-RF wave generated from each patch antenna by controlling the patch antennas or a control means connected with the patch antennas.

The processor 620 may form a RF wave in the direction of the electronic device 650 by controlling the power transmission antenna array 610 or at least one phase shifter or at least one power amplifier connected to the power transmission antenna array 610 based on the direction of the electronic device 650. Meanwhile, the processor 620 may identify the electronic device 650 using information contained in the communication signal 659. The communication signal 659 may include the unique identifier and unique address of the electronic device. The communication circuit 640 may process the communication signal 659 and provide information to the processor 620. The communication circuit 640 and the communication antennas (not shown) may be manufactured based on various communication schemes, such as wireless-fidelity (Wi-Fi), bluetooth, zig-bee, near-field communication (NFC), and bluetooth low energy (BLE), which are not limited to a particular type. Meanwhile, the communication signal 659 may include rated power information about the electronic device 650. The processor 620 may determine whether to charge the electronic device 650 based on at least one of the unique identifier, unique address, and rated power information of the electronic device 650.

Further, the communication signal may be used in the process for the wireless power transmitting device 600 to identify the electronic device 650, the process of permitting power transmission to the electronic device 650, the process of sending a request for RX power-related information to the electronic device 650, and the process of receiving the received power-related information from the electronic device 650. In other words, the communication signal may be used in a process for a subscription, command, or request between the wireless power transmitting device 600 and the electronic device 650.

Meanwhile, the processor 620 may control the power transmission antenna array 610 to form a RF wave 611 in the determined direction of the electronic device 650. The processor 620 may form a RF wave for detection and determine the distance to the electronic device 650 using another communication signal subsequently received as a feedback. For example, the other communication signal may include a time stamp at the time of transmission. The processor 620 may determine the distance to the electronic device 650 by comparing the time of reception with the time stamp included in the other communication signal.

Thus, the processor 620 may determine both the direction of the electronic device 650 and the distance to the electronic device 650 and may thus determine the position of the electronic device 650. The processor 620 may control the patch antennas so that the sub-RF waves generated from the patch antennas may constructively interfere with each other at the position of the electronic device 650. Therefore, the RF wave 611 may be transferred to the power reception antenna 651 at a relatively high transmission efficiency.

The power reception antenna 651 is not limited as long as it is an antenna capable of receiving RF waves. Further, the power reception antenna 651 may be implemented in the form of an array of a plurality of antennas. The AC power received by the power reception antenna 651 may be rectified into DC power by the rectifier 652. The converter 653 may convert the DC power into a voltage required and provide the voltage to the charger 654. The charger 654 may charge a battery (not shown). Although not shown, the converter 653 may provide the converted power to a power management integrated circuit (PMIC) (not shown), and the PMIC (not shown) may provide power to various hardware structures of the electronic device 650. According to another embodiment, the electronic device 650 may not comprise the charger 654. In this embodiment, the converter 353 may directly charge the battery of the electronic device 650.

Meanwhile, the processor 655 may monitor the voltage at the output end of the rectifier 652. For example, the electronic device 650 may further include a voltage meter connected to the output end of the rectifier 652. The processor 655 may receive a voltage value from the voltage meter and monitor the voltage at the output end of the rectifier 652. The processor 655 may provide information containing the voltage value at the output end of the rectifier 652 to the communication circuit 657. The communication circuit 657 may send out the communication signal including RX power-related information using the communication antenna (not shown). The received power-related information may be information associated with the magnitude of power received, such as, e.g., the voltage at the output end of the rectifier 652, and may contain the magnitude of a current at the output end of the rectifier 652. In this case, it will readily be appreciated by one of ordinary skill in the art that the electronic device 650 may further include a current meter or voltage meter capable of measuring current at the output end of the rectifier 652. The current meter may be implemented in various types, such as a DC current meter, AC current meter, or digital current meter, without limited in type thereto. The voltage meter may be implemented in various types, such as an electrodynamic instrument voltage meter, an electrostatic voltage meter, or a digital voltage meter, without limited in type thereto. Further, the received power-related information may be measured at any point of the electronic device 650, but not only at the output end of the rectifier 652.

Further, as set forth above, the processor 657 may send out a communication signal 659 containing identification information about the electronic device 650 to the wireless power transmitting device 600. The memory 656 may store a program or algorithm capable of controlling various hardware units of the electronic device 650.

Figure 7:
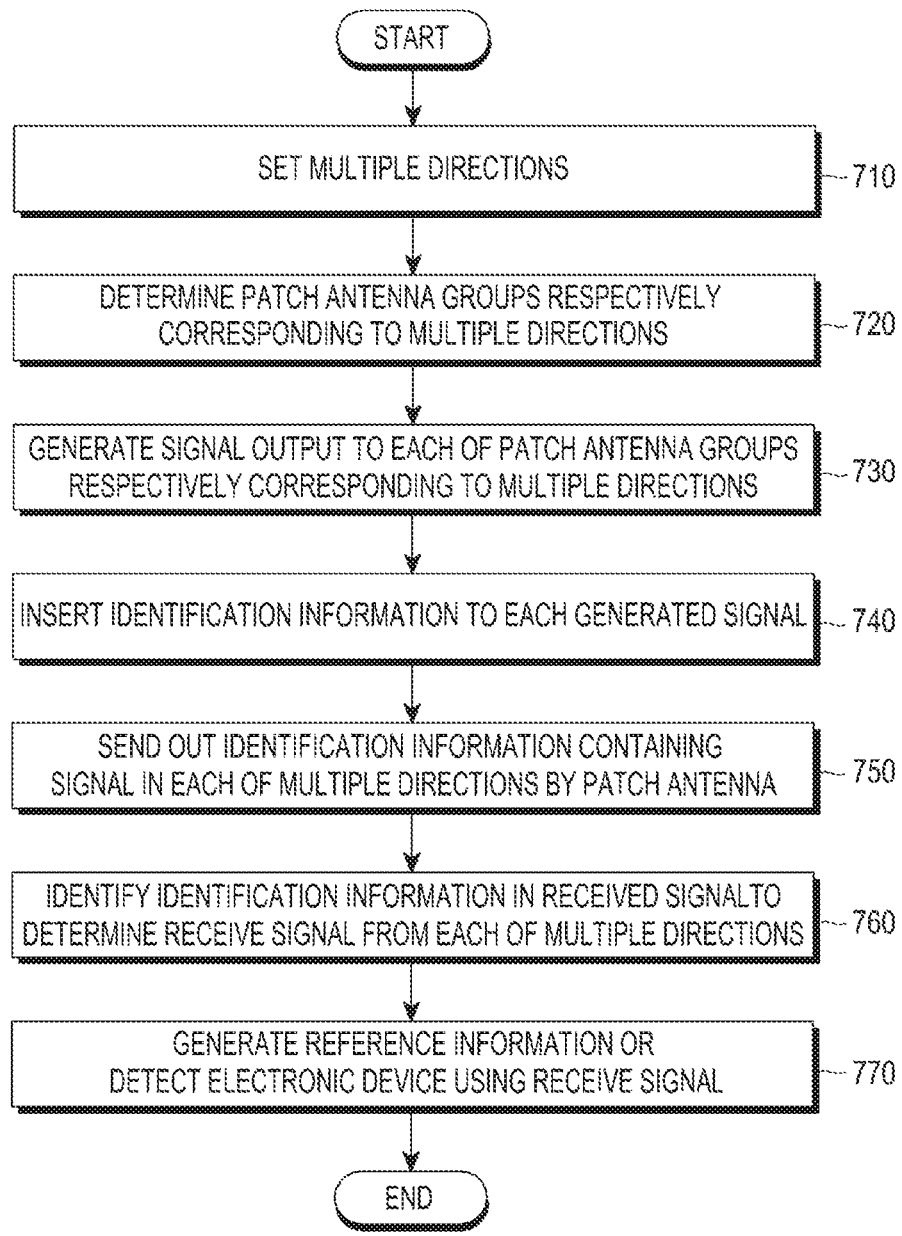
FIG. 7 is a flowchart illustrating an example method for controlling a wireless power transmitting device according to an example embodiment of the present disclosure.

FIG. 7 is a flowchart illustrating an example method for controlling a wireless power transmitting device according to an example embodiment of the present disclosure.

In operation 710, the wireless power transmitting device may set a plurality of directions. In order to further enhance the direction in which the electronic device is positioned, the wireless power transmitting device may set more directions. In operation 720, the wireless power transmitting device may determine a patch antenna group corresponding to each of the plurality of directions. For example, as illustrated in FIG. 5, the wireless power transmitting device may set four patch antennas in one group and form a RF wave for a particular direction.

In operation 730, the wireless power transmitting device may generate a signal output to each of the patch antenna groups respectively corresponding to the plurality of directions. In operation 740, the wireless power transmitting device may insert identification information into each generated signal. For example, the wireless power transmitting device may further include a divider dividing power from the power source to the patch antennas. The power divided by the divider may be modulated by a preset communication scheme, and identification information may be inserted into the modulated signal.

In operation 750, the wireless power transmitting device may send out the identification information-containing signal through the patch antennas in each of the plurality of directions. The identification information-containing signal may be reflected and received by the wireless power transmitting device. In operation 760, the wireless power transmitting device may identify the identification information of the received signal and determine the receive signal from each of the plurality of directions. In operation 770, the wireless power transmitting device may generate reference information or detect an electronic device using the receive signal. For example, a plurality of reflected signals may be received by one patch antenna in the wireless power transmitting device. Although the plurality of reflected signals are received once, the wireless power transmitting device may identify the reflected signals by identifying the identification information.

Figure 8:
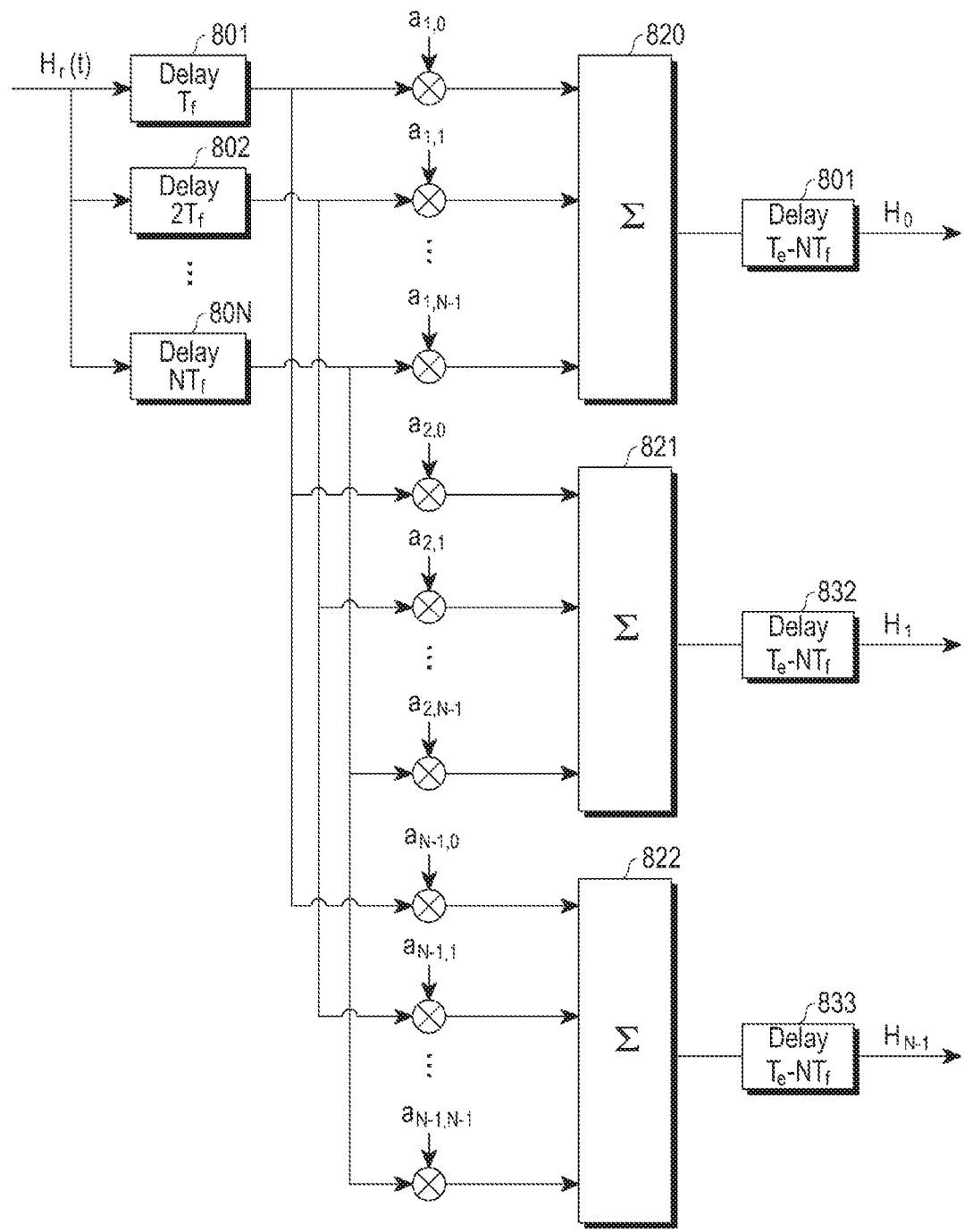
FIG. 8 is a block diagram illustrating example division of reflected signals according to an example embodiment of the present disclosure.

FIG. 8 is a block diagram illustrating example division of reflected signals according to an example embodiment of the present disclosure.

As illustrated in FIG. 8, the wireless power transmitting device may receive reflected signals (Hr(t)). The reflected signals (Hr(t)) are assumed to include all of a reflected signal of a first pilot signal and a reflected signal of a second pilot signal through a reflected signal of a Nth pilot signal.

The wireless power transmitting device may include a plurality of delay components 801, 802, . . . , 80N. Here, the delay components 801, 802, . . . , 80N, respectively, may delay signals by Tf, 2×Tf, N×Tf. The delay components 801, 802, . . . , 80N may be ones for correcting time diversity. The wireless power transmitting device may divide the reflected signals (Hr(t)) to the delay components 801, 802, . . . , 80N, respectively. The delay components 801, 802, . . . , 80N, respectively, may delay the reflected signals (Hr(t)) by preset times.

Each delayed signal may be subject to AND operation with a code. For example, the signal delayed by the delay component 801 may be AND-operated with a code, $a_{1,0}$. In the code denotation, $a_{i,j}$, i may be the index of information indicating the pilot signal, and j may be the index of information for correcting time diversity. For example, the wireless power transmitting device may send out a pilot signal containing the identification information of $a_i$ in an ith direction. The signals delayed by the delay components 801, 802, . . . , 80N may be AND-operated with codes, $a_{1,0}$, $a_{1,1}$, . . . , $a_{1,N-1}$, and results of the AND operation may be added up by an adder 820. The result added by the adder 820 may be delayed by $T_e$-NTf by the delay component 831, wherein $T_e$-NTf may be a mean delay value. Accordingly, a reflected signal $H_0$ corresponding to a zeroth direction may be obtained. For example, the reflected signal $H_0$ may be a time diversity-corrected value, and an exact reflected signal may be obtained. In a similar way to that described above, the results respectively added by the adders 821 and 822 may be delayed as long as $T_e$-NTf by the delay components 832 and 833. Accordingly, reflected signals $H_1$ to $H_{N-1}$ respectively corresponding to the firth direction to the N−1th direction may be obtained. As set forth above, although a plurality of reflected signals are simultaneously received by one antenna, the wireless power transmitting device may differentiate among the reflected signals respectively corresponding to the pilot signals. It will readily be appreciated by one of ordinary skill in the art that the above-described scheme is merely an example and that methods of simultaneously receiving a plurality of signals are not limited.

Figure 9:
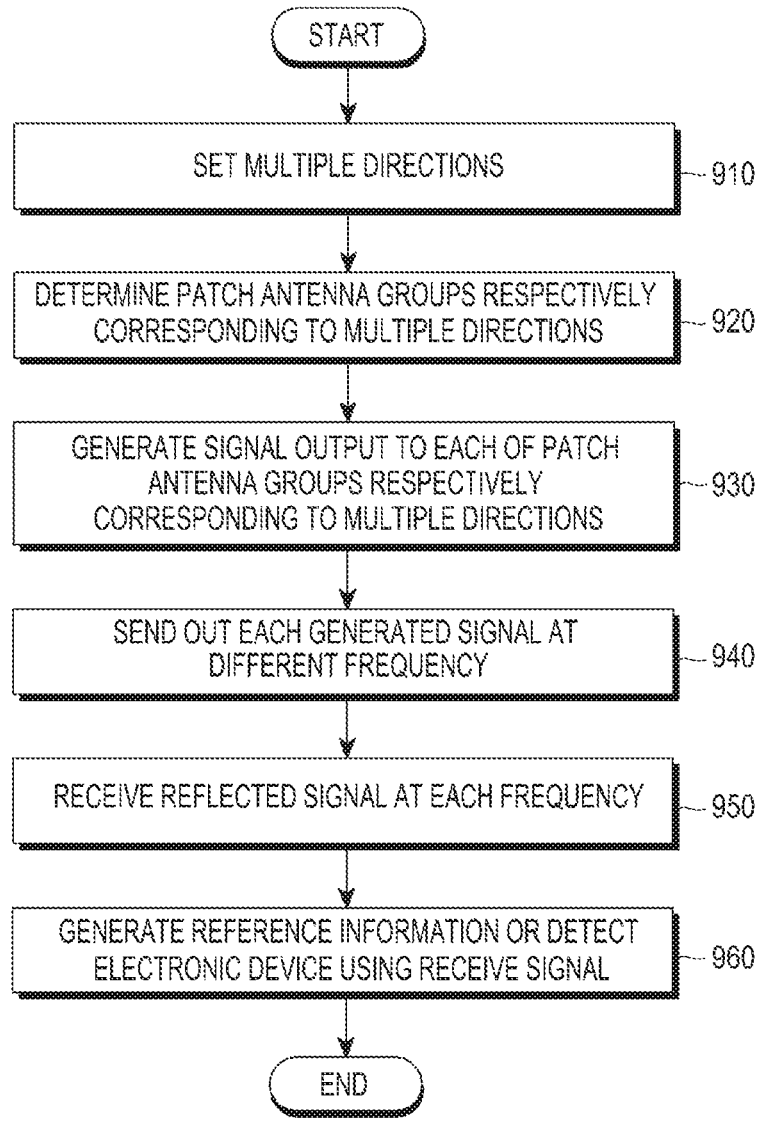
FIG. 9 is a flowchart illustrating an example method for controlling a wireless power transmitting device according to an example embodiment of the present disclosure.

FIG. 9 is a flowchart illustrating an example method for controlling a wireless power transmitting device according to an example embodiment of the present disclosure.

In operation 910, the wireless power transmitting device may set a plurality of directions. In operation 920, the wireless power transmitting device may determine a patch antenna group corresponding to each of the plurality of directions. In operation 930, the wireless power transmitting device may generate a signal output to each of the patch antenna groups respectively corresponding to the plurality of directions.

In operation 940, the wireless power transmitting device may send out each generated signal at a different frequency. For example, the wireless power transmitting device may modulate a signal output to each patch antenna to have a different frequency. The signals modulated to have different frequencies may be input to the patch antennas, respectively, and accordingly, the patch antennas, respectively, may send out signals having different frequencies in different directions.

In operation 950, the wireless power transmitting device may receive reflected signals at each of the frequencies, respectively. For example, the wireless power transmitting device may further include a plurality of filters respectively passing through different-frequency signals. After dividing the received signals into a plurality of paths, the wireless power transmitting device may conduct filtering to receive the reflected signals at the frequencies, respectively. In operation 960, the wireless power transmitting device may generate reference information or detect an electronic device using the receive signal.

Figure 10:
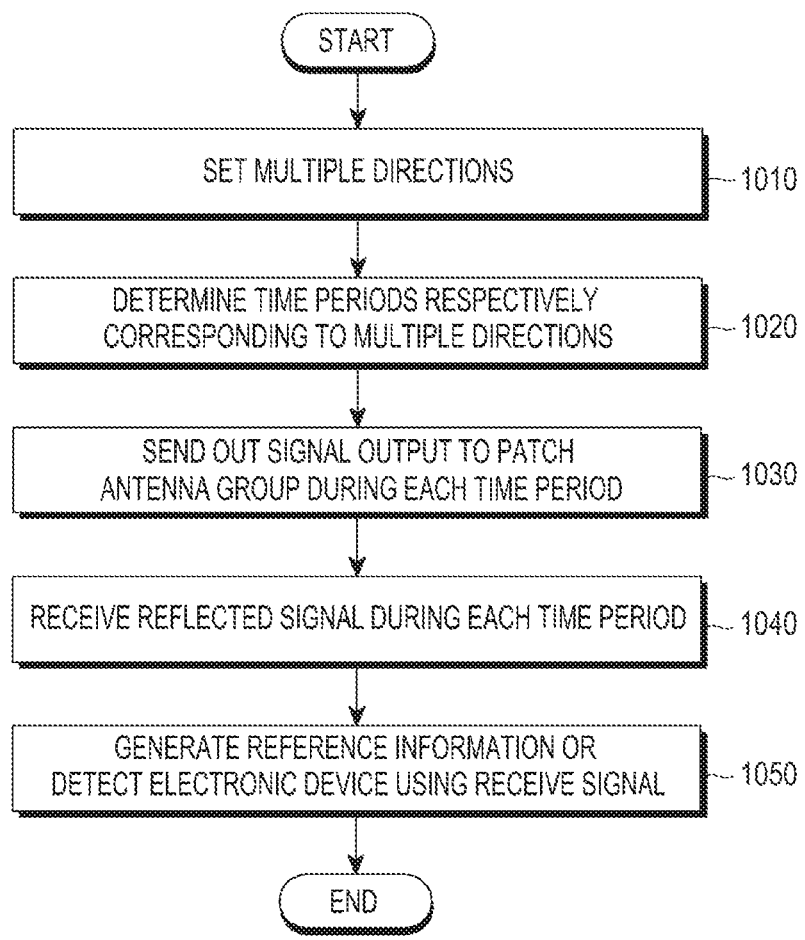
FIG. 10 is a flowchart illustrating an example method for controlling a wireless power transmitting device according to an example embodiment of the present disclosure.

FIG. 10 is a flowchart illustrating an example method for controlling a wireless power transmitting device according to an example embodiment of the present disclosure.

In operation 1010, the wireless power transmitting device may set a plurality of directions. In operation 1020, the wireless power transmitting device may determine a time period corresponding to each of a plurality of directions. In operation 1030, the wireless power transmitting device may send out signals output to the patch antenna groups during time periods, respectively. In operation 1040, the wireless power transmitting device may receive the reflected signals during the time periods, respectively. For example, the wireless power transmitting device may send out a sub-RF wave, e.g., a pilot signal, in a first direction during a first time period. The wireless power transmitting device may receive a reflected signal during a second time period. The signal received during the second time period may be a reflected signal of the pilot signal sent out in the first direction. Thereafter, the wireless power transmitting device may send out a pilot signal in a second direction during a third time period. The wireless power transmitting device may receive a reflected signal of the pilot signal sent out in the second direction during a fourth time period. In operation 1050, the wireless power transmitting device may generate reference information or detect an electronic device using the receive signal.

Figure 11:
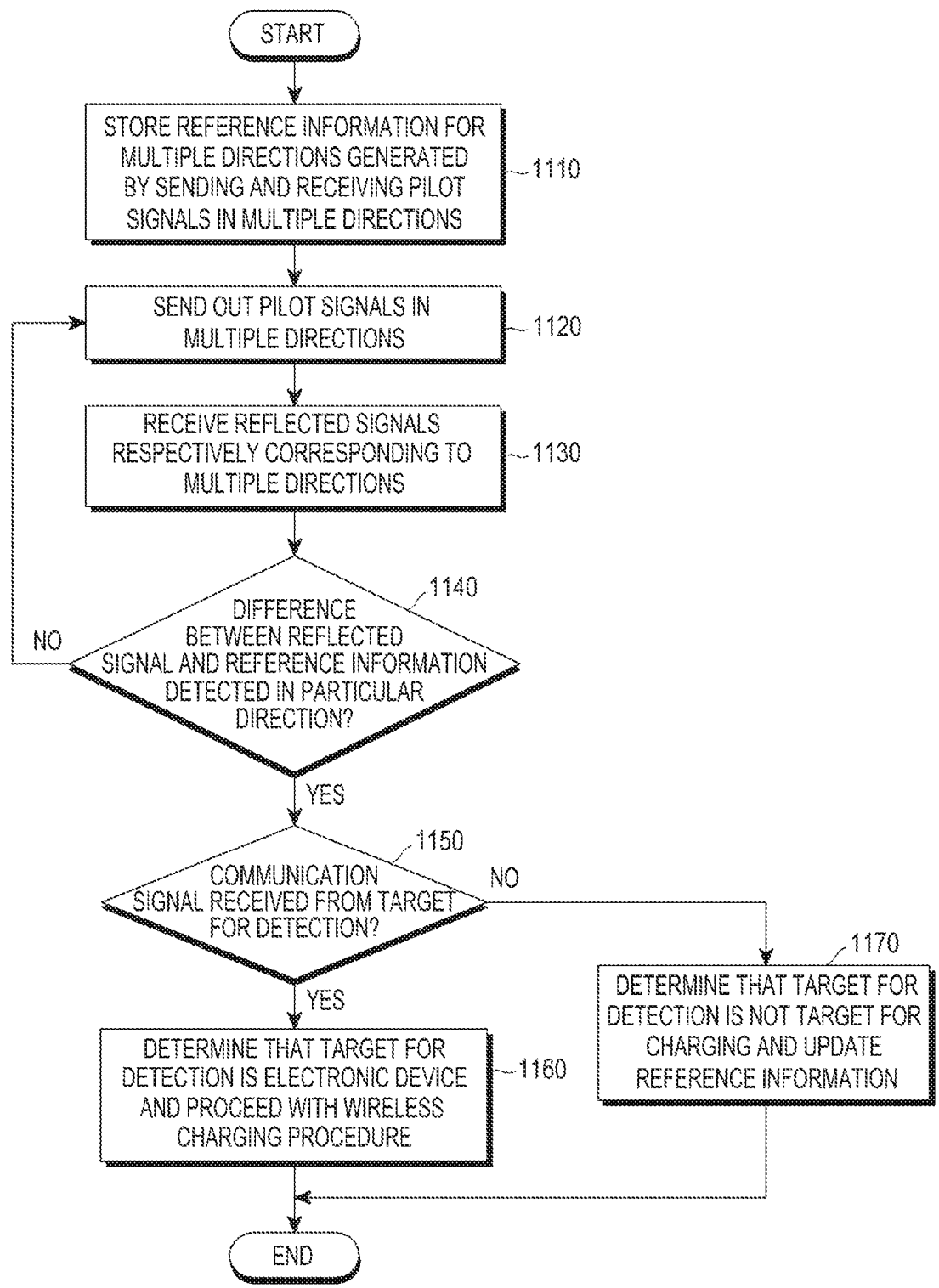
FIG. 11 is a flowchart illustrating an example method for controlling a wireless power transmitting device according to an example embodiment of the present disclosure.

FIG. 11 is a flowchart illustrating an example method for controlling a wireless power transmitting device according to an example embodiment of the present disclosure.

In operation 1110, the wireless power transmitting device may send out pilot signals in a plurality of directions, receive reflected signals, and generate and store reference information for the plurality of directions. In operation 1120, the wireless power transmitting device may send out pilot signals in multiple directions. In operation 1130, the wireless power transmitting device may receive reflected signals respectively corresponding to the plurality of directions. In operation 1140, the wireless power transmitting device may determine whether a difference is detected between the reflected signal and reference information in a particular direction. The wireless power transmitting device may determine whether a difference between at least one of the amplitude, phase, and time of flight, which are characteristics of the reflected signal, and at least one of the amplitude, phase, and time of flight of the reference information exceeds a preset threshold.

Upon determining that the difference between the reflected signal and the reference information is detected in a particular direction, the wireless power transmitting device, in operation 1150, may determine whether a communication signal is received from a target for detection.

When a communication signal is received, the wireless power transmitting device, in operation 1160, may determine that the target for detection is the electronic device and proceed with a wireless charging procedure. When no communication signal is received, the wireless power transmitting device, in operation 1170, may determine that the target for detection is not a target for charging and update the reference information. For example, the wireless power transmitting device may store the reference information indicating that a signal attenuation in the fourth direction is −4.1 dB, a phase variation is −3 rad, and a time of flight is 0.28 µs, as shown in Table 1. The wireless power transmitting device may determine that the reflected signal is subject to a signal attenuation of −1.2 dB, a phase variation of 40 rad, and a time of flight of 0.12 µs, as compared with the pilot signal. As set forth above, the wireless power transmitting device may detect a target for detection in the fourth direction. When no communication signal is received, the wireless power transmitting device may determine that the target for detection is an obstacle and update the reference information in the fourth direction as shown in Table 2.

TABLE 2

| Direction | Amplitude attenuation (dB) | Phase variation (rad) | Time of flight (µs) |
|---|---|---|---|
| First direction | −2 | +13 | 0.12 |
| Second direction | −4 | −2 | 0.24 |
| Third direction | −3 | +17 | 0.15 |
| Fourth direction | −1.2 | 40 | 0.12 |

Accordingly, the wireless power transmitting device may adaptively manage the reference information even though the topography of the area is varied.

Figure 12A:
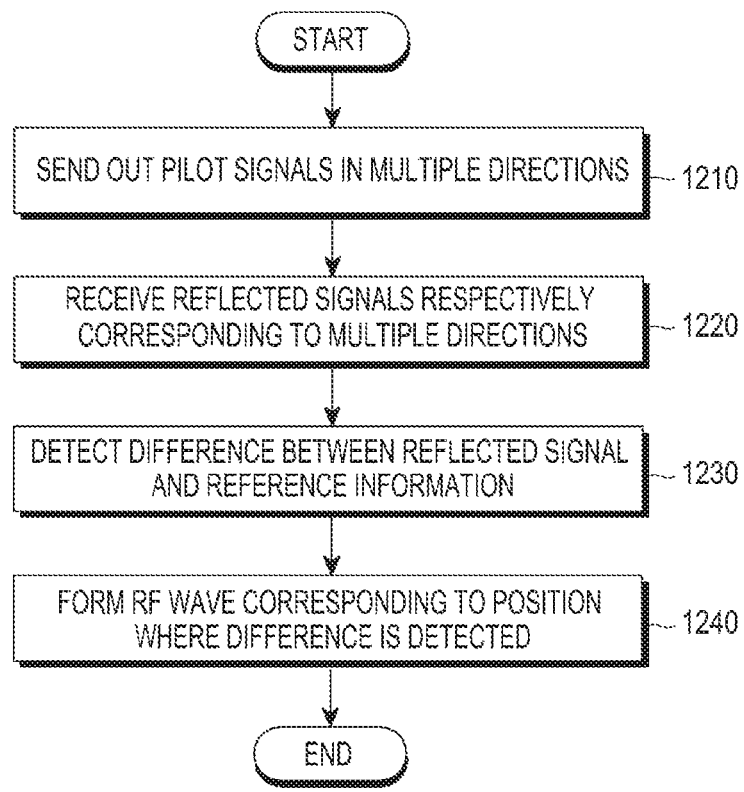
FIGS. 12A and 12B are flowcharts illustrating an example method for controlling a wireless power transmitting device according to an example embodiment of the present disclosure.

FIG. 12A is a flowchart illustrating an example method for controlling a wireless power transmitting device according to an example embodiment of the present disclosure.

In operation 1210, the wireless power transmitting device may send out pilot signals in multiple directions. In operation 1220, the wireless power transmitting device may receive reflected signals respectively corresponding to the plurality of directions. In operation 1230, the wireless power transmitting device may detect a difference between the reflected signal and the reference information.

In operation 1240, the wireless power transmitting device may form a RF wave corresponding to the position where a difference has been detected. For example, the wireless power transmitting device may determine the direction in which the difference has occurred. The wireless power transmitting device may additionally determine the distance to the target for detection based on the time of flight. Accordingly, the wireless power transmitting device may determine the position of the target for detection and control at least one of the phase and amplitude of each of the patch antennas so that sub-RF waves constructively interfere with each other at the position of the target for detection. Or, where the target for detection is the electronic device, the wireless power transmitting device may receive a communication signal from the electronic device. According to an example embodiment of the present disclosure, the communication signal may include at least one of the amplitude of the time of transmission and the time stamp of the time of transmission. The wireless power transmitting device may compare the amplitude of the time of transmission of the communication signal with the amplitude of the time of reception of the communication signal and determine the distance to the electronic device depending on the degree of attenuation. Or, the wireless power transmitting device may determine the distance to the electronic device based on a difference between the time stamp of the time of transmission and the time of reception of the communication signal.

Figure 12B:
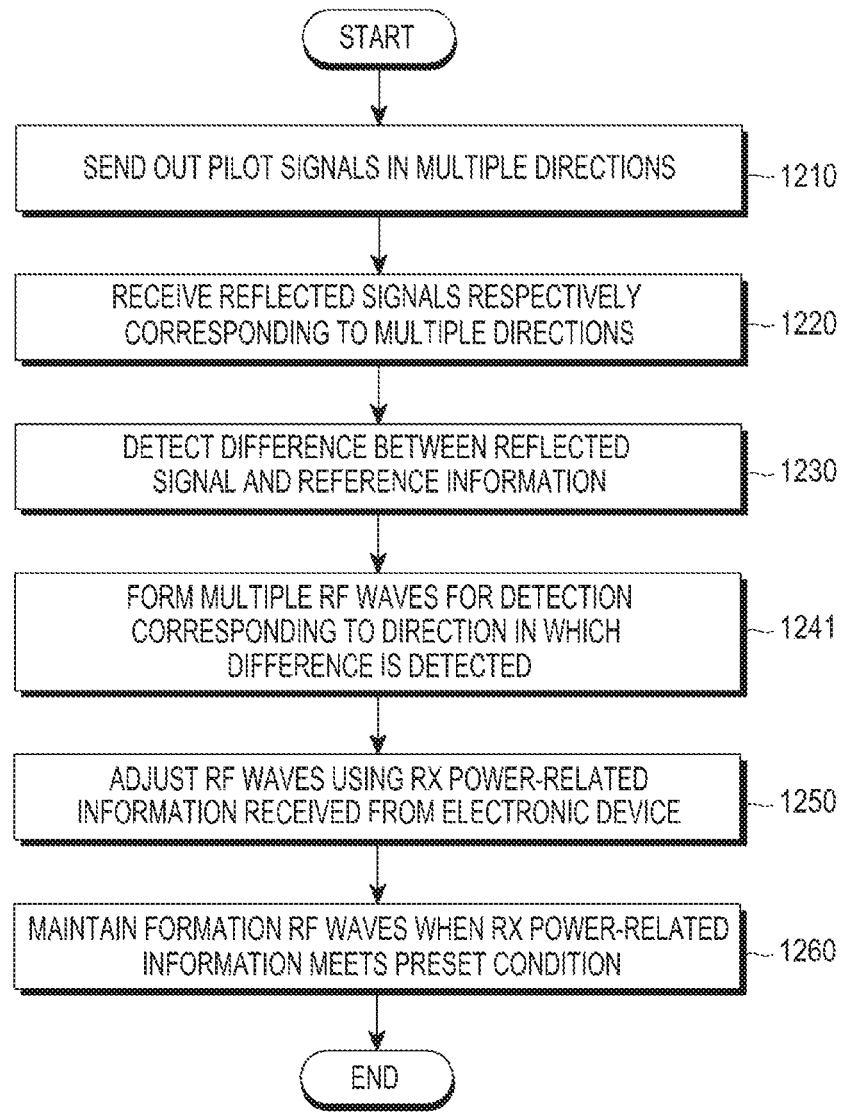
Figure 13:
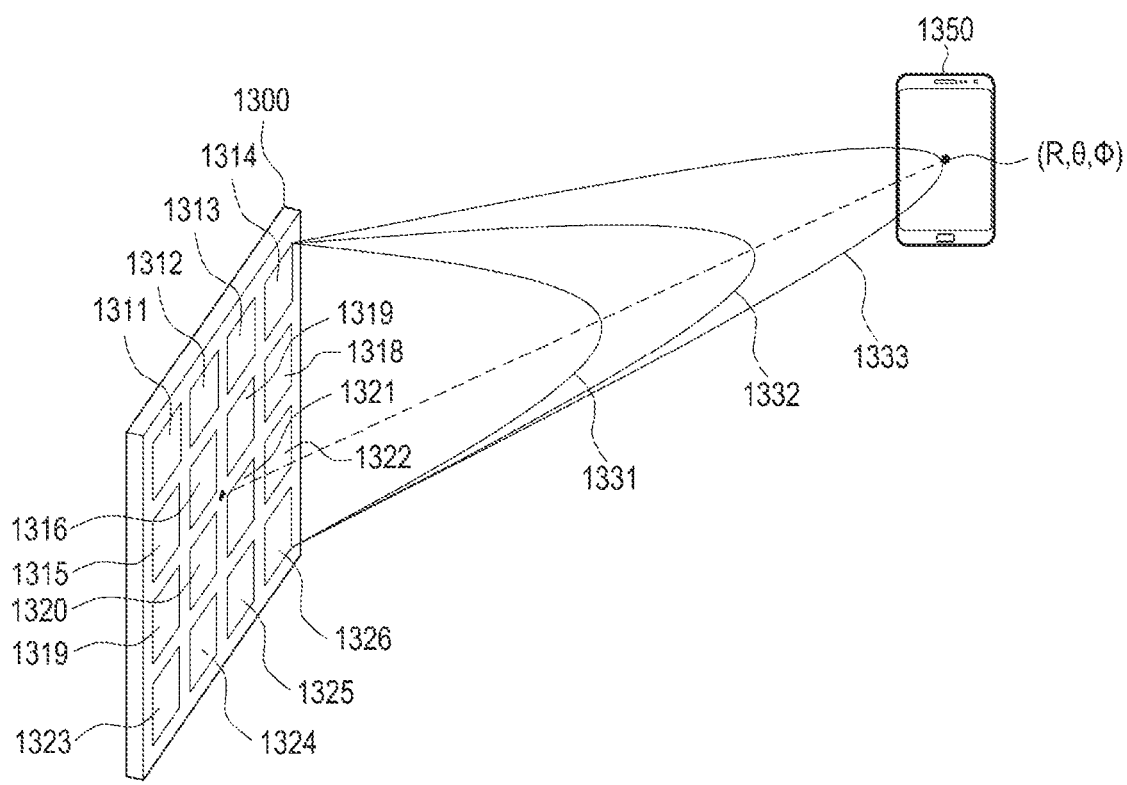
FIG. 13 is a diagram illustrating example formation of a RF wave by a wireless power transmitting device according to an example embodiment of the present disclosure.

FIG. 12B is a flowchart illustrating an example method for controlling a wireless power transmitting device according to an example embodiment of the present disclosure. The embodiment illustrated in FIG. 12B is described in greater detail with reference to FIG. 13. FIG. 13 is a diagram illustrating example formation of a RF wave by a wireless power transmitting device according to an example embodiment of the present disclosure.

Operations 1210 to 1230 may be similar to those of FIG. 12A. In operation 1241, the wireless power transmitting device may sequentially form a plurality of RF waves for detection for detecting the electronic device, corresponding to the direction where a difference between the reflected signal and the reference information has been detected. In operation 1250, the wireless power transmitting device may adjust the RF waves using RX power-related information received from the electronic device. In operation 1260, the wireless power transmitting device may maintain the formation of the RF waves when the received power-related information meets a preset condition. In other words, the wireless power transmitting device may adjust the RF waves until the received power-related information meets the preset condition.

As illustrated in FIG. 13, the wireless power transmitting device 1300 may determine at least one of the phase and amplitude for each patch antenna 1311 to 1326 to form RF waves for detection in a determined direction (θ,φ) where the difference has been detected. For example, upon determining that the electronic device 1350 is positioned relatively in a right direction, the wireless power transmitting device 1300 may apply a relatively large delay to patch antennas positioned relatively at a left side so that the sub-RF waves respectively generated from the plurality of patch antennas 1311 to 1326 may constructively interfere with each other relatively at a right side. Also, upon determining that the electronic device 1350 is positioned relatively at an upper side from the wireless power transmitting device 1300, the wireless power transmitting device 1300 may apply a relatively large delay to patch antennas positioned relatively at an upper side so that the sub-RF waves respectively generated from the plurality of patch antennas 1311 to 1326 may constructively interfere with each other relatively at an upper side. The wireless power transmitting device 1300 may apply different delays to the patch antennas 1311 to 1326, respectively, arranged in two-dimension (2D), allowing the RF wave generated by each of the patch antennas 1311 to 1326 to have a different phase.

The wireless power transmitting device 1300 may determine the magnitude of power applied to each patch antenna 1311 to 1326 so that a RF wave 1331 for detection is formed corresponding to a first test distance. According to an embodiment of the present disclosure, the wireless power transmitting device 1300 may directly determine the magnitude of first test power provided to the plurality of patch antennas 1311 to 1326 without determining distance. Here, the first test distance or the magnitude of the first test power may have a default value.

The wireless power transmitting device 1300 may form a RF wave 1331 corresponding to the first test distance using the determined power applied to each patch antenna 1311 to 1326 and at least one of the determined phase and amplitude for each patch antenna 1311 to 1326.

The wireless power transmitting device 1300 may receive RX power-related information from the electronic device 1350. The wireless power transmitting device 1300 may determine whether the received power-related information meets a preset condition. For example, the wireless power transmitting device 1300 may determine whether the voltage at the output end of the rectifier of the electronic device 1350, which is the received power-related information, exceeds a preset threshold.

When the received power-related information fails to meet the preset condition, the wireless power transmitting device 1300 may adjust the power applied to each patch antenna 1311 to 1326 to form a RF wave 1332 for detection corresponding to a next test distance. As set forth supra, the wireless power transmitting device 1300 may determine the magnitude of next test power immediately without determining a test distance and apply the same to each patch antenna 1311 to 1326. Meanwhile, although FIG. 13 illustrates that the wireless power transmitting device 1300 increases the test distance in the example embodiment, this is merely an example. The wireless power transmitting device 1300 may also reduce the test distance. Meanwhile, the wireless power transmitting device 1300 may adjust the magnitude of power applied to each patch antenna 1311 to 1326 until the received power-related information meets the preset condition. For example, the wireless power transmitting device 1300 may adjust the magnitude of the power applied to each patch antenna 1311 to 1326 until the voltage at the output end of the rectifier of the electronic device 1350 reports a value exceeding a preset threshold.

When the received power-related information meets the preset condition, the wireless power transmitting device 1300 may maintain the power applied to each patch antenna to send out a RF wave and perform wireless charging. In the embodiment illustrated in FIG. 13, where a RF wave 1333 is formed to have a third test distance, the received power-related information may be determined to be met. The wireless power transmitting device 1300 may maintain the magnitude of power applied to each patch antenna 1311 to 1326 so as to maintain the formation of the RF wave 1333 in the third test distance. The wireless power transmitting device 1300 may determine that the distance to the electronic device 1350 is the third test distance R or may control only power applied to each patch antenna 1311 to 1326 without determination as to the distance to the electronic device 1350.

Figure 14:
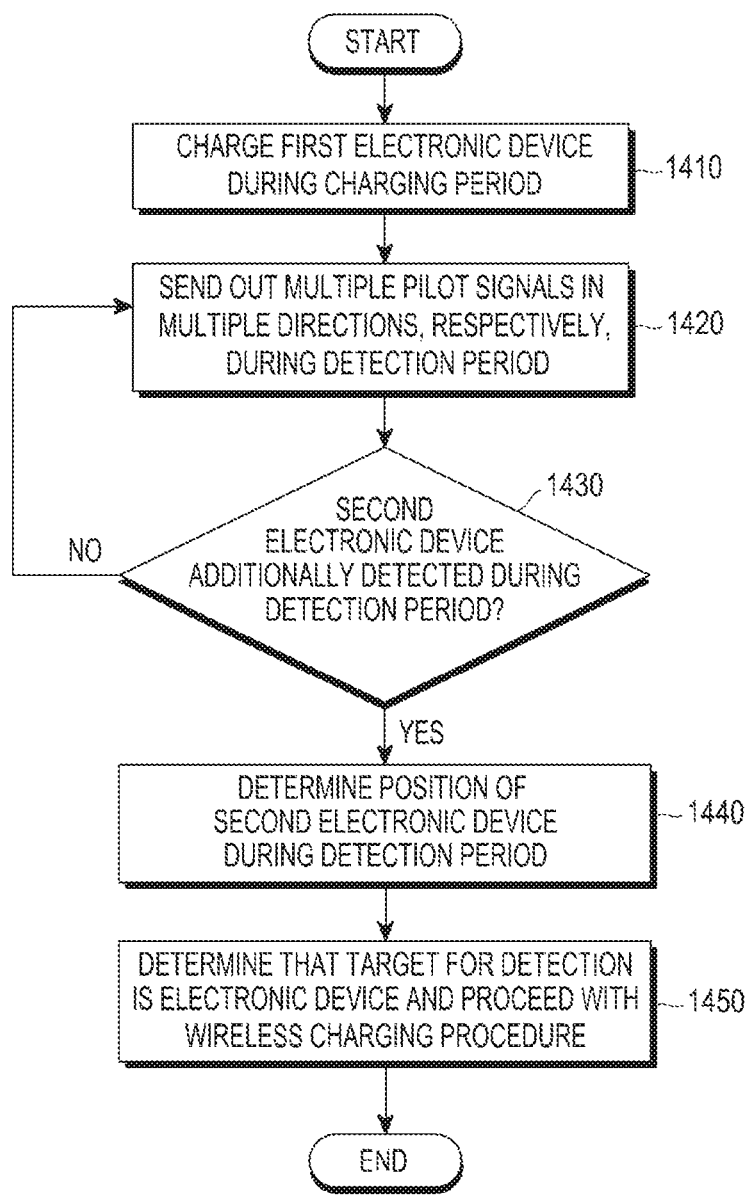
FIG. 14 is a flowchart illustrating example charging a plurality of electronic devices according to an example embodiment of the present disclosure.
Figure 15A:
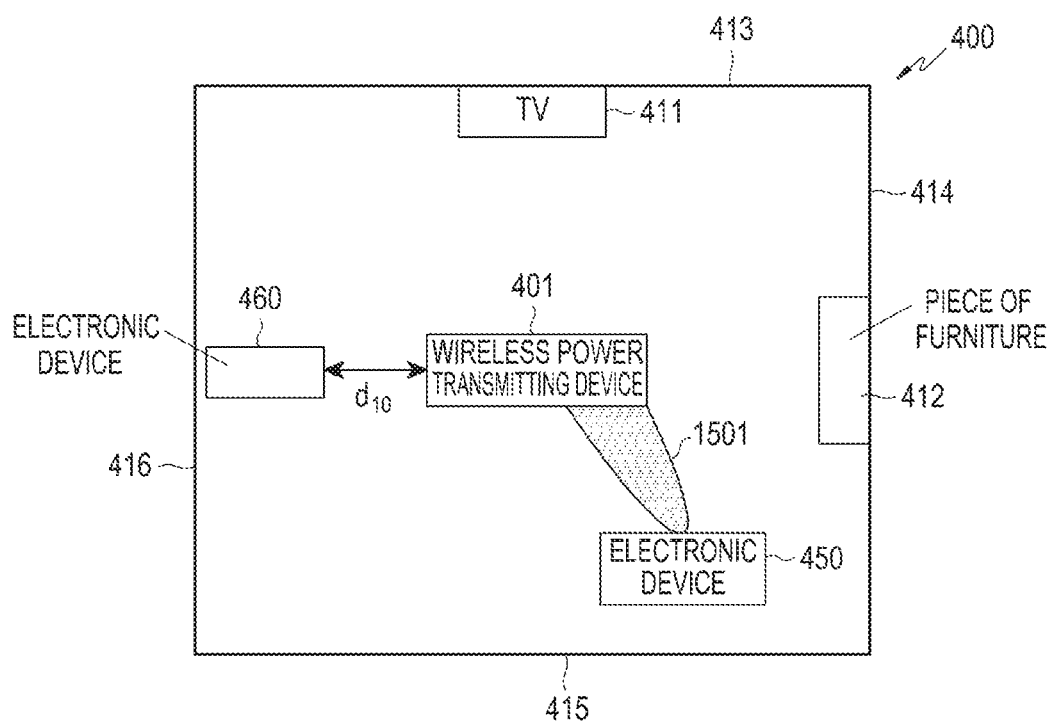
FIGS. 15A and 15B are plan views illustrating an area including a wireless power transmitting device according to an example embodiment of the present disclosure.
Figure 15B:
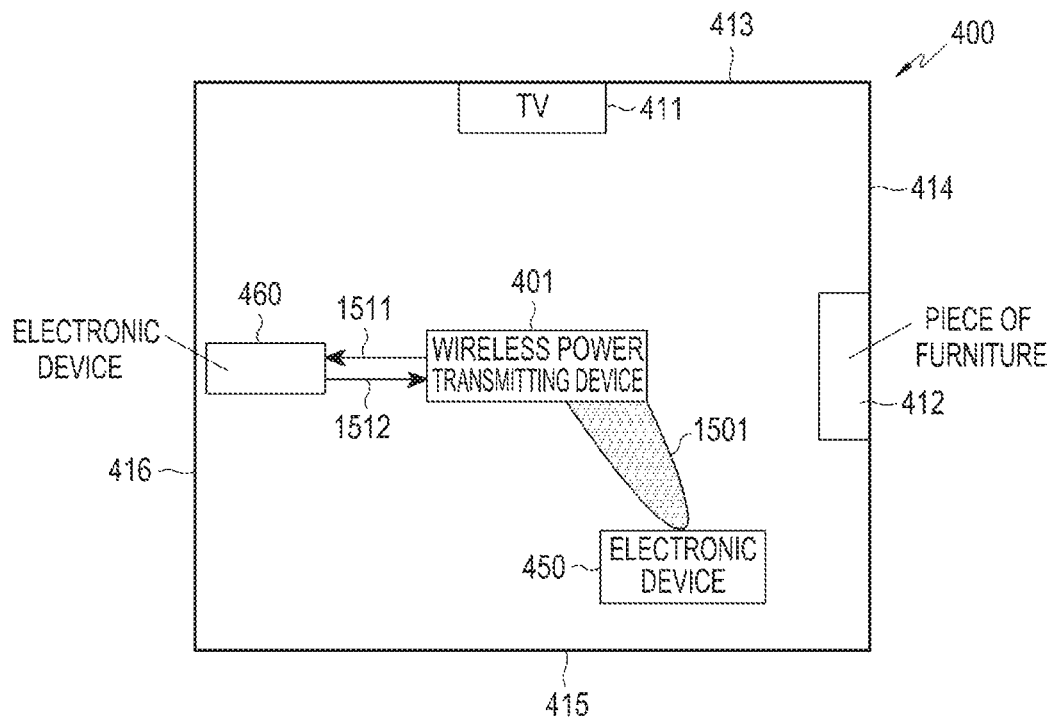
Figure 15C:
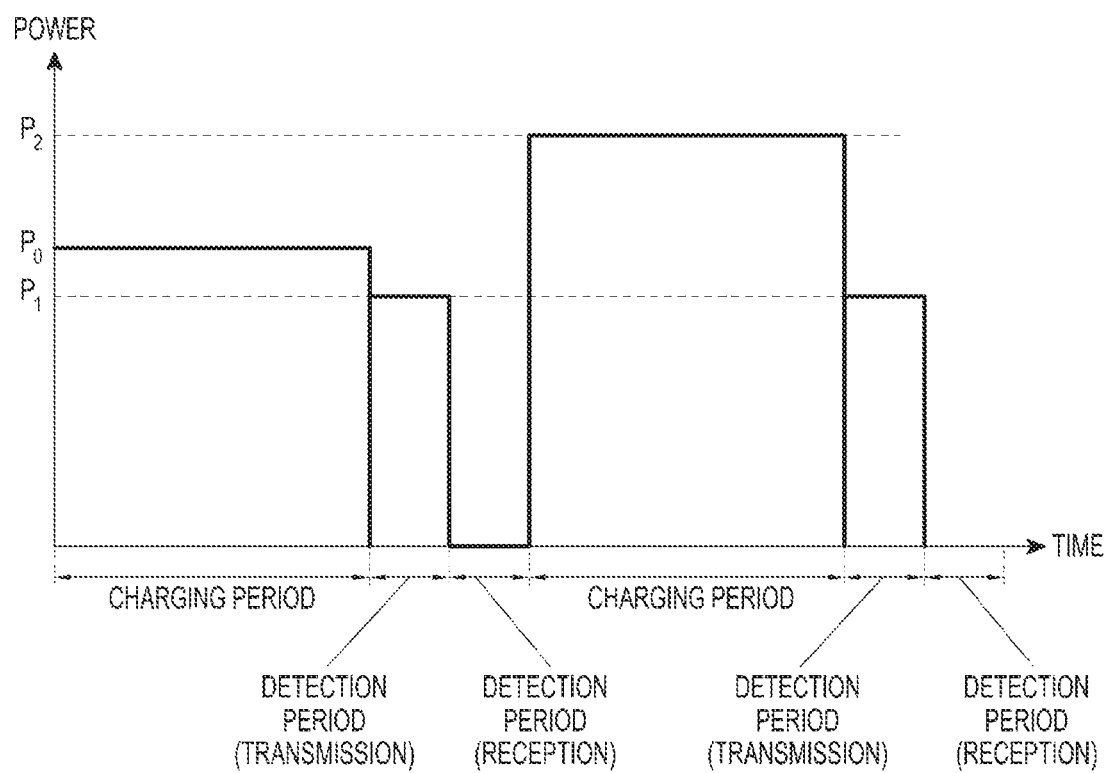
FIG. 15C is a diagram illustrating an example charging period and a detection period according to an example embodiment of the present disclosure.

FIG. 14 is a flowchart illustrating example charging of a plurality of electronic devices according to an example embodiment of the present disclosure. The embodiment related to FIG. 14 is described in greater detail with reference to FIGS. 15A, 15B and 15C. FIGS. 15A and 15B are plan views illustrating an area including a wireless power transmitting device according to an example embodiment of the present disclosure. FIG. 15C is a view illustrating a charging period and a detection period according to an example embodiment of the present disclosure.

In operation 1410, the wireless power transmitting device may charge a first electronic device during a charging period. For example, as illustrated in FIG. 15A, the wireless power transmitting device 401 may form a RF wave 1501 corresponding to the position of the electronic device 450.

In operation 1420, the wireless power transmitting device may send out a plurality of pilot signals in a plurality of directions, respectively, during a detection period. For example, as illustrated in FIG. 15B, the wireless power transmitting device 401 may stop forming the RF wave 1501 and send out a pilot signal 1511. Although FIG. 15B illustrates that the wireless power transmitting device 401 sends out one pilot signal 1511, this is merely an example for ease of description. The wireless power transmitting device 401 may send out pilot signals in a plurality of directions as illustrated in FIG. 4B. The wireless power transmitting device 401 may receive a reflected signal 1512 of the pilot signal 1511.

In operation 1430, the wireless power transmitting device may determine whether a second electronic device is additionally detected during the detection period. For example, as illustrated in FIG. 15B, the wireless power transmitting device 401 may receive the reflected signal 1512 and compare the reflected signal 1512 with reference information to additionally detect the second electronic device 460.

In operation 1440, the wireless power transmitting device may determine the position, e.g., direction and distance d10, of the second electronic device during the detection period. Or, the wireless power transmitting device may adjust and form a RF wave for the second electronic device 460 without determining the distance, d10, until the received power-related information meets a preset condition. In operation 1450, the wireless power transmitting device may charge the first electronic device and the second electronic device during a charging period. According to an example embodiment of the present disclosure, the wireless power transmitting device may determine a patch antenna group for charging each of the plurality of electronic devices. The wireless power transmitting device may wirelessly charge the plurality of electronic devices using the patch antenna groups. In other words, the wireless power transmitting device may divide the plurality of patch antennas into a patch antenna for charging the first electronic device and a patch antenna for charging the second electronic device and may perform charging. Or, the wireless power transmitting device may charge the plurality of electronic devices by charging the first electronic device during a first charging period and the second electronic device during a second charging period.

FIG. 15C is a view illustrating an example of a charging period and a detection period according to an example embodiment of the present disclosure.

Referring to FIG. 15C, the wireless power transmitting device may send out power of, e.g., a magnitude of P0, during a first charging period. Here, the magnitude of P0 may be the magnitude of power for charging the first electronic device. Meanwhile, when the charging period ends, the wireless power transmitting device may enter into a detection period. The wireless power transmitting device may send out pilot signals in a plurality of directions during a detection period for transmission. The magnitude P1 may be the magnitude of a pilot signal. The wireless power transmitting device may control each patch antenna to receive a reflected signal during a detection period for reception. The wireless power transmitting device may detect the second electronic device by analyzing the reflected signal. The wireless power transmitting device may re-enter into the charging period and send out power of a magnitude of P2. Here, the magnitude of P2 may be the magnitude of power for charging the first electronic device and the second electronic device. The wireless power transmitting device may re-enter into the detection period and send out a pilot signal and receive a reflected signal. The duration of the charging period and detection period may be adjusted.

Meanwhile, what is illustrated in FIG. 15C is merely an example. According to an example embodiment of the present disclosure, the wireless power transmitting device may also send out a pilot signal for detection upon aperiodically detecting a particular event.

Figure 16:
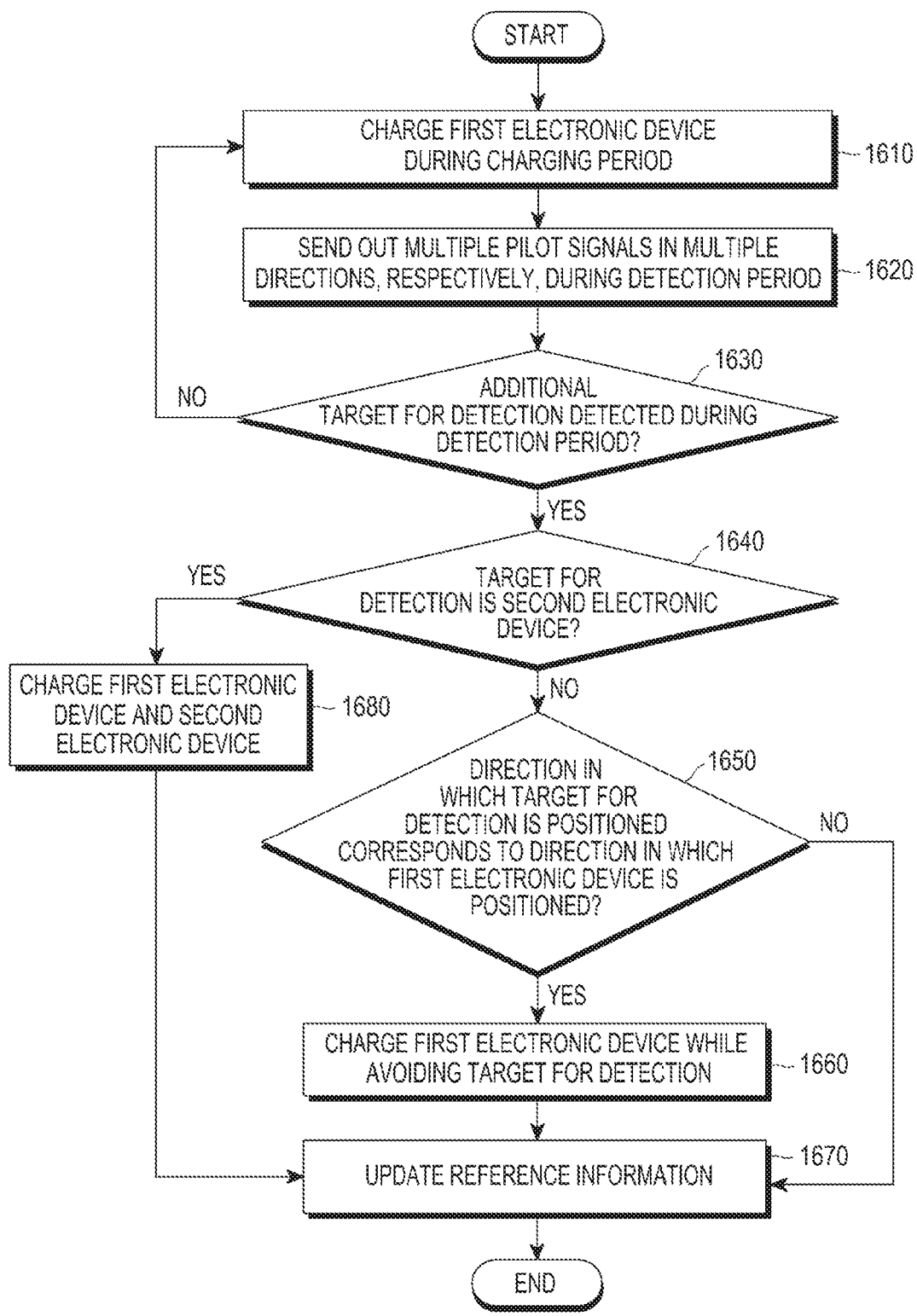
FIG. 16 is a flowchart illustrating an example method for controlling a wireless power transmitting device according to an example embodiment of the present disclosure.
Figure 17A:
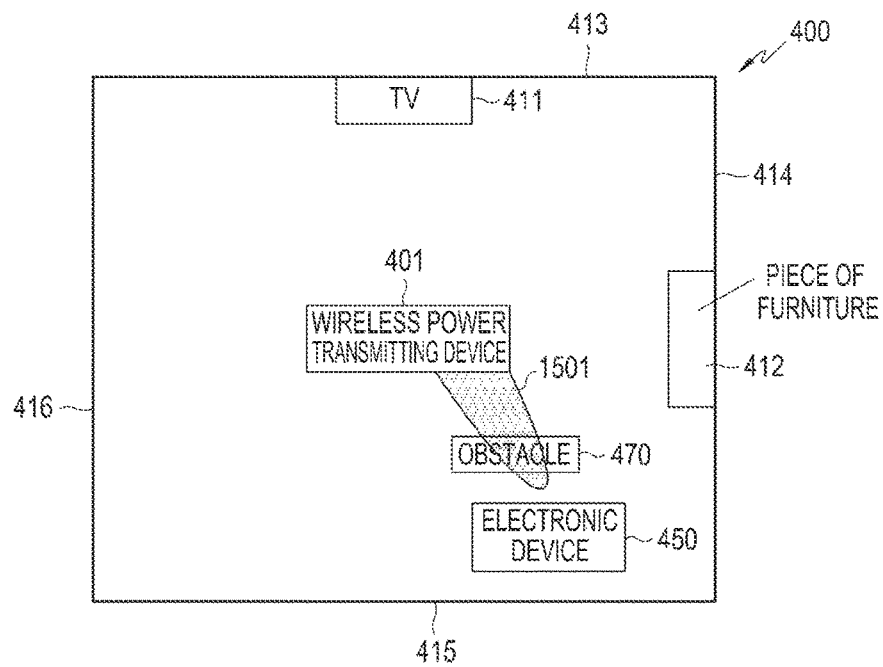
FIGS. 17A and 17B are plan views illustrating an area including a wireless power transmitting device according to an example embodiment of the present disclosure.
Figure 17B:
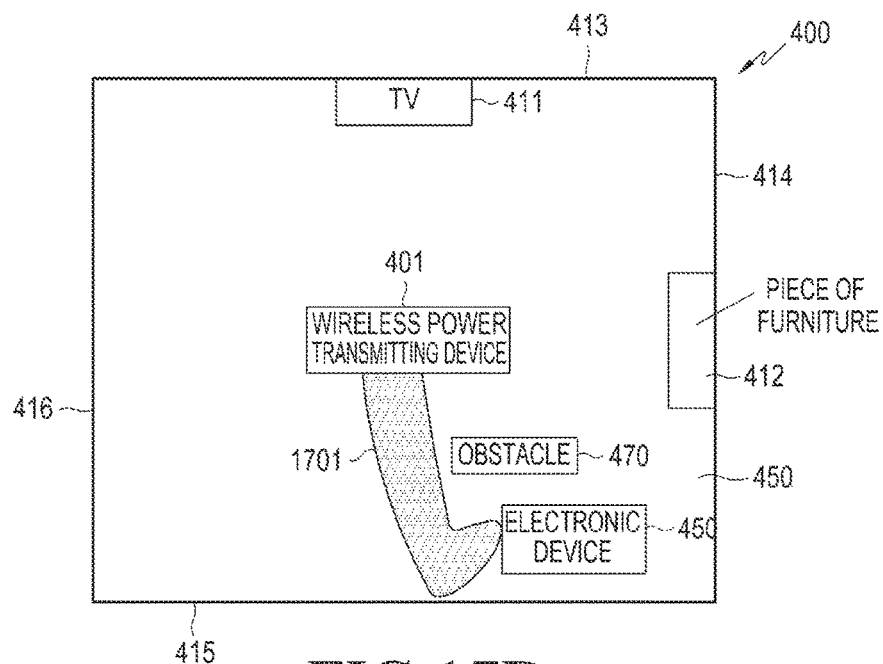

FIG. 16 is a flowchart illustrating an example method for controlling a wireless power transmitting device according to an example embodiment of the present disclosure. The embodiment of FIG. 16 is described in greater detail with reference to FIGS. 17A and 17B. FIGS. 17A and 17B are plan views illustrating an area including a wireless power transmitting device according to an example embodiment of the present disclosure.

In operation 1610, the wireless power transmitting device 401 may charge the electronic device 450 during a charging period. As set forth above, the wireless power transmitting device 401 may determine at least one of the direction and position of the electronic device 450 as it previously sends out a pilot signal and receives a reflected signal and may conduct charging using the same. For example, as illustrated in FIG. 17A, the wireless power transmitting device 401 may form a RF wave 1501 corresponding to the position of the electronic device 450. Meanwhile, an obstacle 470 is assumed to be positioned between the wireless power transmitting device 401 and the electronic device 450 during the course of charging.

In operation 1620, the wireless power transmitting device 401 may send out a plurality of pilot signals in a plurality of directions, respectively, during a detection period. Although not shown, the wireless power transmitting device 401 may send out a plurality of pilot signals in a plurality of directions and receive reflected signals corresponding thereto. In operation 1630, the wireless power transmitting device 401 may determine whether an additional target for detection is detected during the detection period.

In operation 1640, the wireless power transmitting device 401 may determine whether the target for detection is another electronic device. For example, the wireless power transmitting device 401 may determine whether the target is the electronic device depending on whether a communication signal is received from the target for detection. When no communication signal is received, the wireless power transmitting device 401 may determine that the target for detection is an obstacle 470.

In operation 1650, the wireless power transmitting device 401 may determine whether the direction in which the target for detection corresponds to the direction in which the existing electronic device 450 used to perform charging is positioned. As described above, the wireless power transmitting device 401 may previously determine the direction in which the electronic device 450 is positioned and may determine the direction in which the target for detection, e.g., the obstacle 470, is positioned according to the transmission of the pilot signal and the reception of the reflected signal in operation 1630. When a difference between the direction in which the electronic device 450 is positioned and the direction in which the obstacle 470 is positioned is less than a preset threshold, the wireless power transmitting device 401 may determine that the direction in which the obstacle 470 is positioned corresponds to the direction in which the electronic device 450 is positioned. Here, the preset threshold may previously be set to the degree by which the obstacle 470 may affect the charging of the electronic device 450. As illustrated in FIG. 17A, where the obstacle 470 is positioned on the path along which the RF wave 1501 is formed, the obstacle 470 may absorb part of the RF wave 1501, causing a deterioration of charging efficiency.

In operation 1660, the wireless power transmitting device 401 may charge the electronic device 450 while avoiding the target for detection, e.g., the obstacle 470. For example, as illustrated in FIG. 17B, the wireless power transmitting device 401 may form a RF wave 1701 in a direction different from an existing one. The RF wave 1701 may be sent out from the wireless power transmitting device 401, reflected by a structure, e.g., a wall, and then propagate to the electronic device 450. Accordingly, the electronic device 450 may be wirelessly charged without influence from the obstacle 470.

In operation 1670, the wireless power transmitting device 401 may update reference information. The wireless power transmitting device 401 may reflect the characteristic of the reflected signal for the direction in which the obstacle 470 is positioned to the reference information. Further, the wireless power transmitting device 401 may also store information about a detour path associated with the direction in which the obstacle 470 is positioned. Thus, upon determining later that another electronic device is positioned in the direction along which the obstacle 470 is positioned, the wireless power transmitting device 401 may form the RF wave 1701 through the detour path, not in the corresponding direction.

In operation 1680, where the target for detection is determined to be the second electronic device, the wireless power transmitting device may charge both the first electronic device and the second electronic device.

Figure 18:
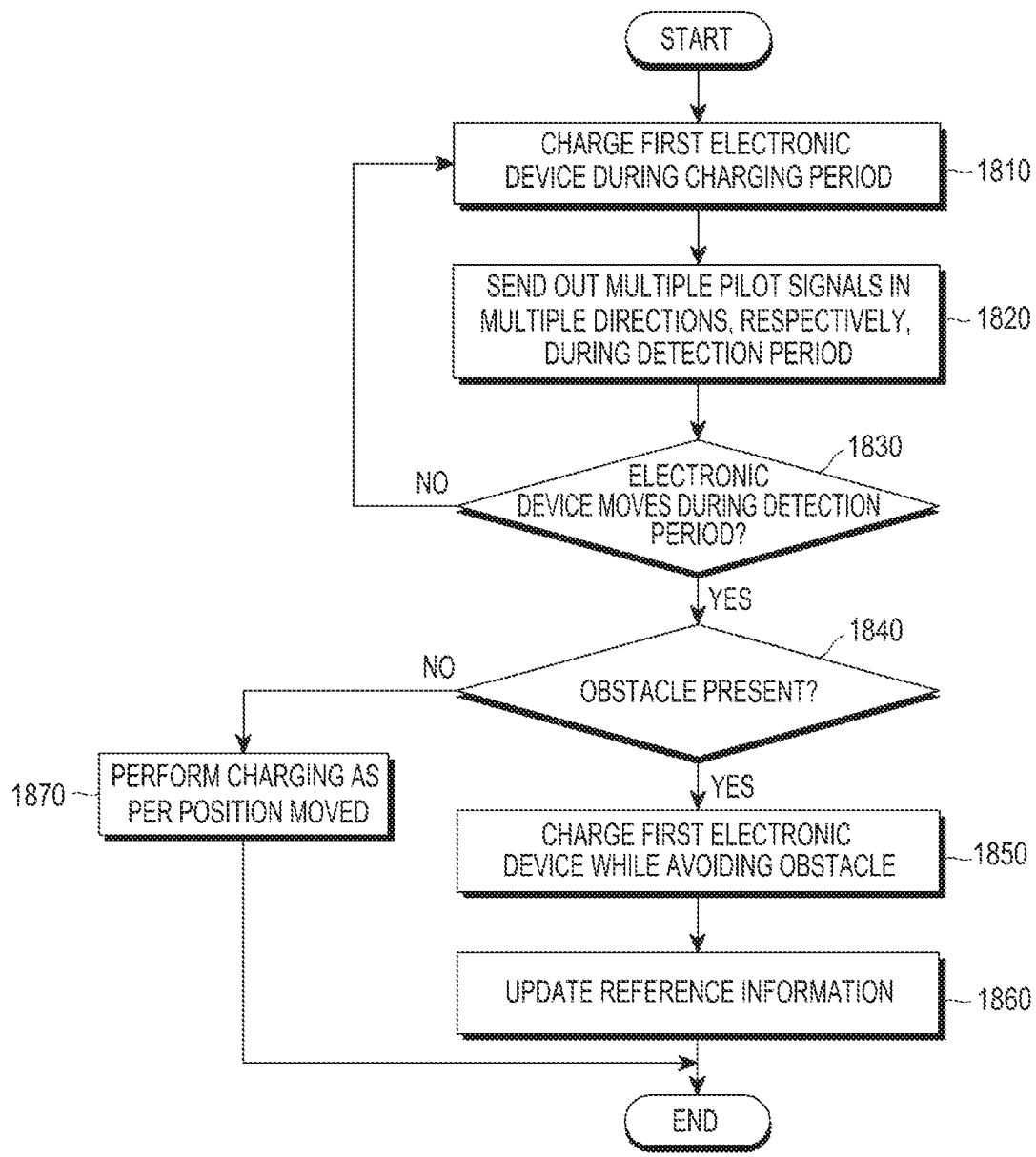
FIG. 18 is a flowchart illustrating an example method for controlling a wireless power transmitting device according to an example embodiment of the present disclosure.
Figure 19A:
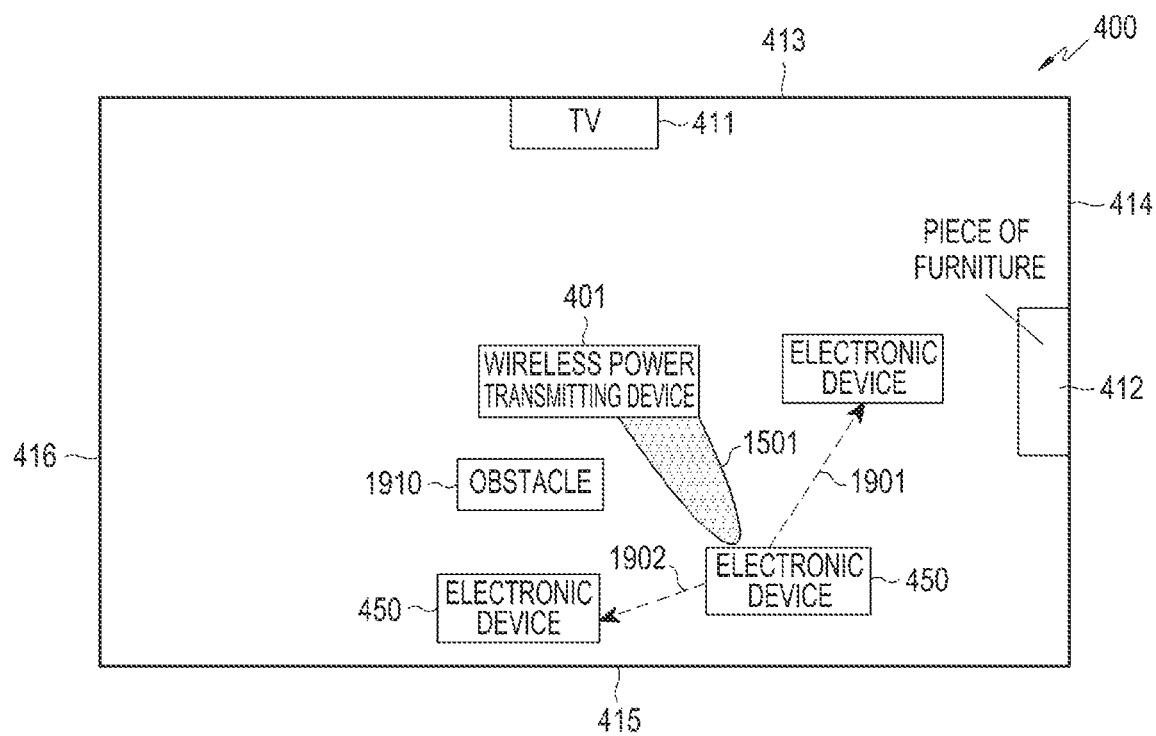
FIGS. 19A and 19B are plan views illustrating an area including a wireless power transmitting device according to an example embodiment of the present disclosure.
Figure 19B:
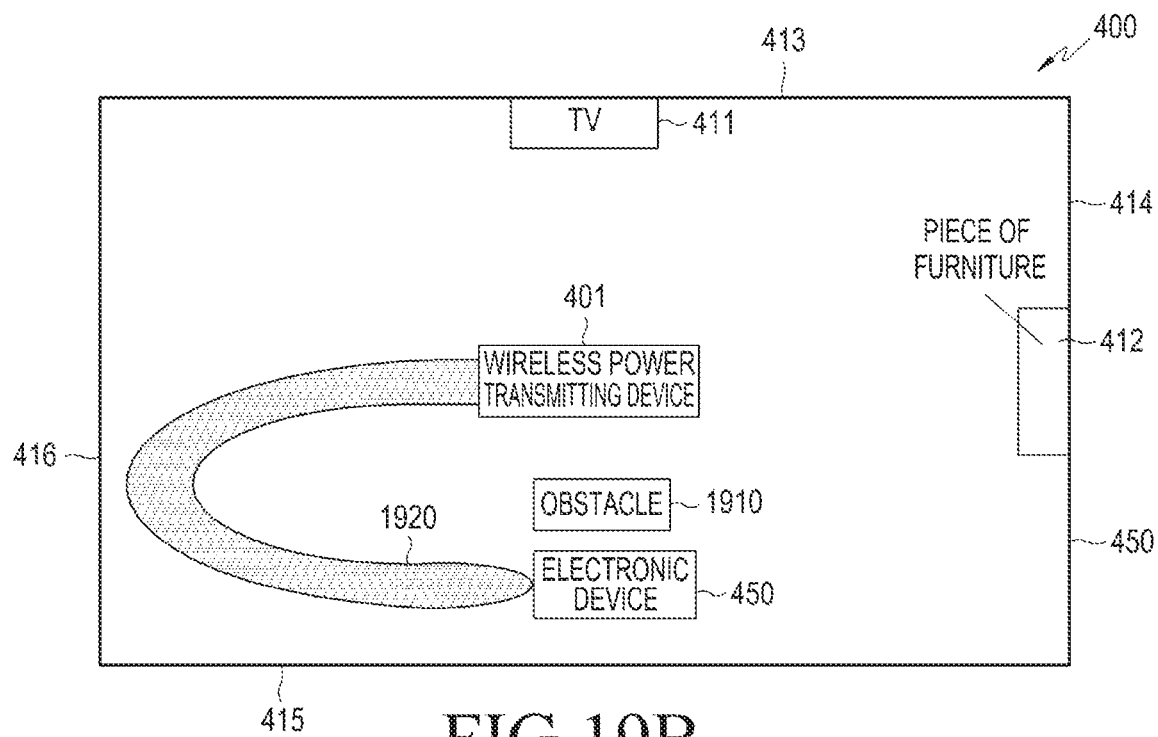

FIG. 18 is a flowchart illustrating an example method for controlling a wireless power transmitting device according to an example embodiment of the present disclosure. The embodiment of FIG. 18 is described in greater detail with reference to FIGS. 19A and 19B. FIGS. 19A and 19B are plan views illustrating an area including a wireless power transmitting device according to an example embodiment of the present disclosure.

In operation 1810, the wireless power transmitting device 401 may charge the electronic device 450 during a charging period. For example, the wireless power transmitting device 401 may detect the presence of a difference between the reference information and the signal characteristic of the reflected signal of the pilot signal for the fourth direction during the previous detection period and may then charge the electronic device 450 positioned in the fourth direction. In operation 1820, the wireless power transmitting device 401 may send out a plurality of pilot signals in a plurality of directions, respectively, during a detection period.

In operation 1830, the wireless power transmitting device 401 may detect a move of the electronic device 450 during the detection period. For example, the wireless power transmitting device 401 may detect the presence of a difference between the reference information and the characteristic of the reflected signal of the pilot signal for the fifth direction during the detection period. Additionally, the wireless power transmitting device 401 may detect the absence of a difference between the existing reference information and the characteristic of the reflected signal of the pilot signal for the fourth direction. Accordingly, the wireless power transmitting device 401 may determine that the electronic device 450 moves in the fifth direction. According to an embodiment of the present disclosure, the wireless power transmitting device 401 may determine the move of the electronic device 450 using move information directly received from the electronic device 450. According to an embodiment of the present disclosure, the wireless power transmitting device 401 may determine the move of the electronic device 450 based on the direction of reception of a communication signal received from the electronic device 450. The wireless power transmitting device 401 may also determine the move of the electronic device 450 using various positioning methods, such as time difference of arrival (TDOA) or frequency difference of arrival (FDOA).

In operation 1840, the wireless power transmitting device 401 may determine whether there is an obstacle between the electronic device 450 and the wireless power transmitting device 401. For example, as illustrated in FIG. 19A, an obstacle 1910 may be positioned at a lower side of the wireless power transmitting device 401. The wireless power transmitting device 401 may store the signal characteristic for the direction in which the obstacle 1910 is positioned upon generating the reference information. The wireless power transmitting device 401 may determine whether the obstacle 1910 is positioned by comparing the direction in which the obstacle 1910 is positioned with the post-move direction of the electronic device 450. Where the electronic device 450 moves in an upper direction 1901, the wireless power transmitting device 401 may detect the electronic device 450 in the direction in which a piece of furniture 412 is positioned. In this case, since the direction in which the electronic device 450 is positioned differs from the direction in which the obstacle 1910 is positioned, the wireless power transmitting device 401 may determine that the obstacle 1910 is not positioned in the direction of the electronic device 450. Where the electronic device 450 moves in a left direction 1902, the wireless power transmitting device 401 may detect the electronic device 450 in the direction in which the obstacle 1910 is positioned. In this case, since a difference between the direction in which the electronic device 450 and the direction in which the obstacle 1910 is positioned may be less than a preset threshold, the wireless power transmitting device 401 may determine that the obstacle 1910 is positioned in the direction of the electronic device 450.

Upon determining that no obstacle is positioned between the electronic device 450 and the wireless power transmitting device 401, the wireless power transmitting device 401 may charge the electronic device 450, corresponding to the moved position, in operation 1870. Upon determining that an obstacle is positioned between the electronic device 450 and the wireless power transmitting device 401, the wireless power transmitting device 401 may charge the electronic device 450 while avoiding the obstacle 1910 in operation 1850. For example, as illustrated in FIG. 19B, the wireless power transmitting device 401 may charge the electronic device 450 while avoiding the obstacle 1910 by forming the RF wave 1920 through a detour path.

In operation 1860, the wireless power transmitting device 401 may update the reference information by reflecting the moved position of the electronic device 450 to the reference information.

As set forth above, the wireless power transmitting device 401 may perform wireless charging while tracking movement of the electronic device 450.

Figure 20:
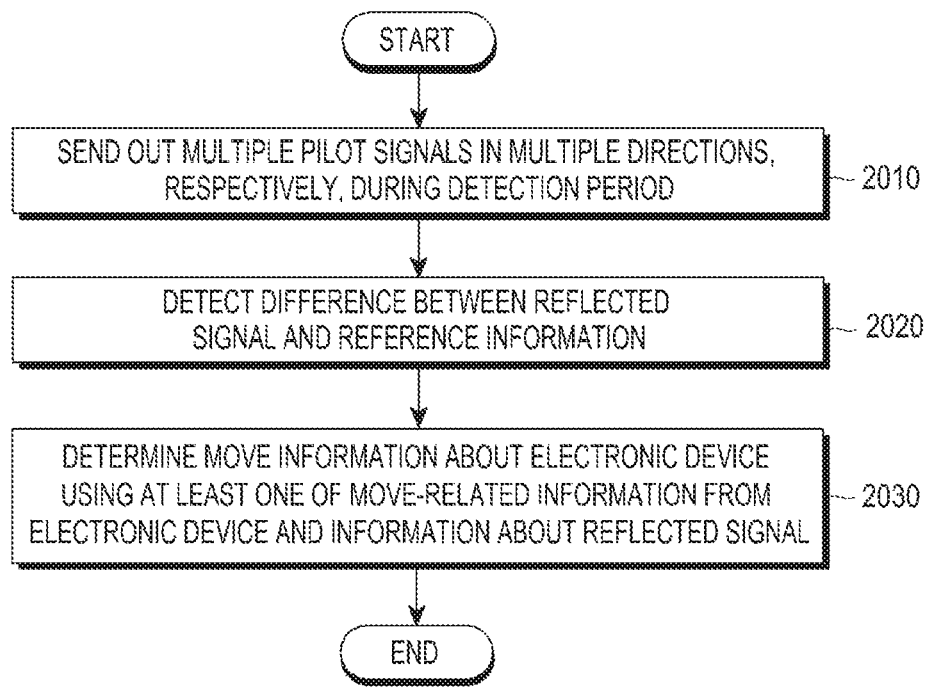
FIG. 20 is a flowchart illustrating an example method for controlling a wireless power transmitting device according to an example embodiment of the present disclosure.

FIG. 20 is a flowchart illustrating an example method for controlling a wireless power transmitting device according to an example embodiment of the present disclosure.

In operation 2010, the wireless power transmitting device may send out a plurality of pilot signals in a plurality of directions, respectively, during a detection period. In operation 2020, the wireless power transmitting device may detect a difference between the reflected signal and the reference information. In operation 2030, the wireless power transmitting device may determine move information about the electronic device using at least one of information about a reflected signal and move-related information from the electronic device. For example, the wireless power transmitting device may periodically or aperiodically receive move information from the electronic device. The electronic device may include various sensors, such as a gyro sensor, a 3-axis acceleration sensor, or a geo-magnetic sensor, capable of a motion of the electronic device, and the electronic device may send out move information determined based on a value sensed by the sensor to the wireless power transmitting device. The wireless power transmitting device may more exactly determine the post-move position of the electronic device using the move information about the electronic device, as well as the direction where a difference from the reference information has been detected.

Figure 21:
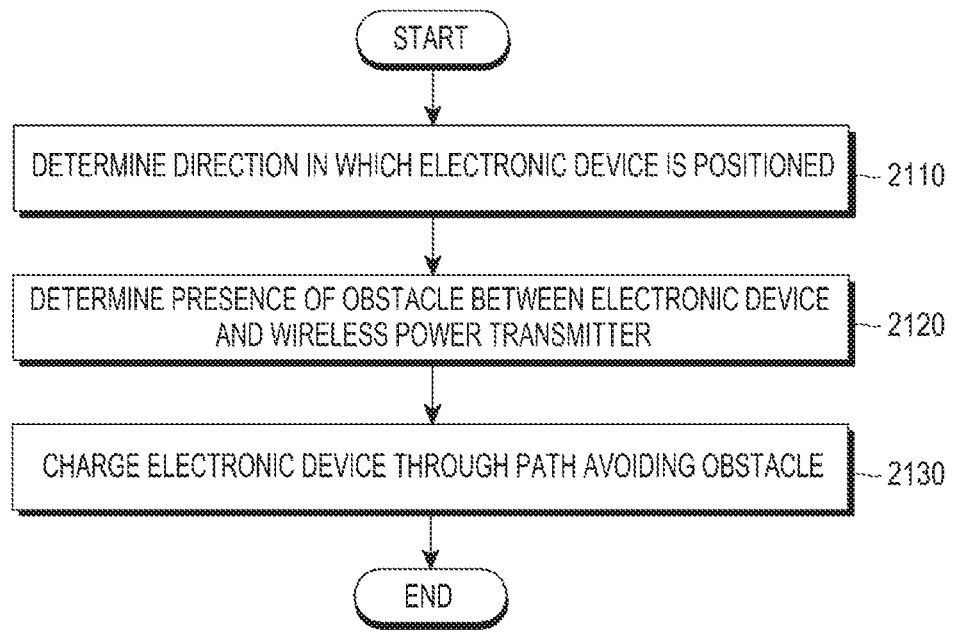
FIG. 21 is a flowchart illustrating an example method for controlling a wireless power transmitting device according to an example embodiment of the present disclosure.

FIG. 21 is a flowchart illustrating an example method for controlling a wireless power transmitting device according to an example embodiment of the present disclosure.

In operation 2110, the wireless power transmitting device may determine the direction in which the electronic device is positioned. As described above, the wireless power transmitting device may determine the direction in which the electronic device is positioned by sending out a pilot signal in a detection period, receiving a reflected signal, and comparing the characteristic of the reflected signal with reference information. In operation 2120, the wireless power transmitting device may determine that an obstacle is present between the electronic device and the wireless power transmitting device.

In operation 2130, the wireless power transmitting device may charge the electronic device through a detour path along which the obstacle is avoided. The wireless power transmitting device may form a RF wave along the path of avoidance in various manners, which is described below in greater detail.

Figure 22:
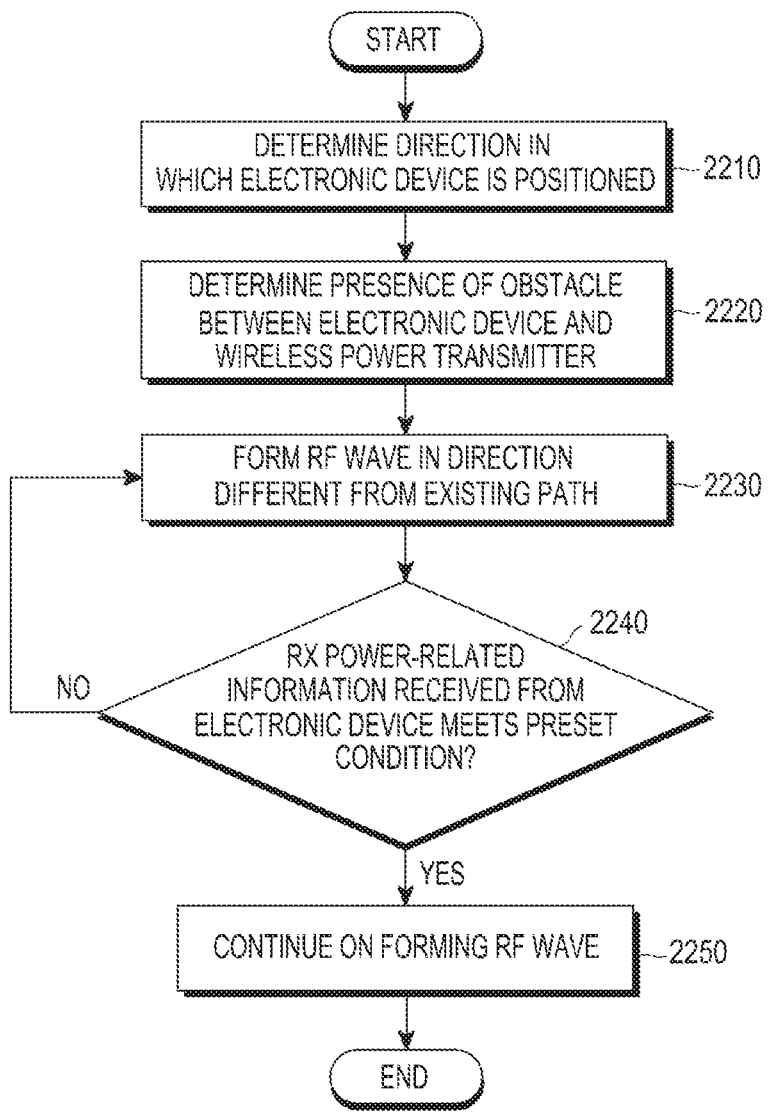
FIG. 22 is a flowchart illustrating an example method for forming a RF wave through an avoidance path according to an example embodiment of the present disclosure.
Figure 23A:
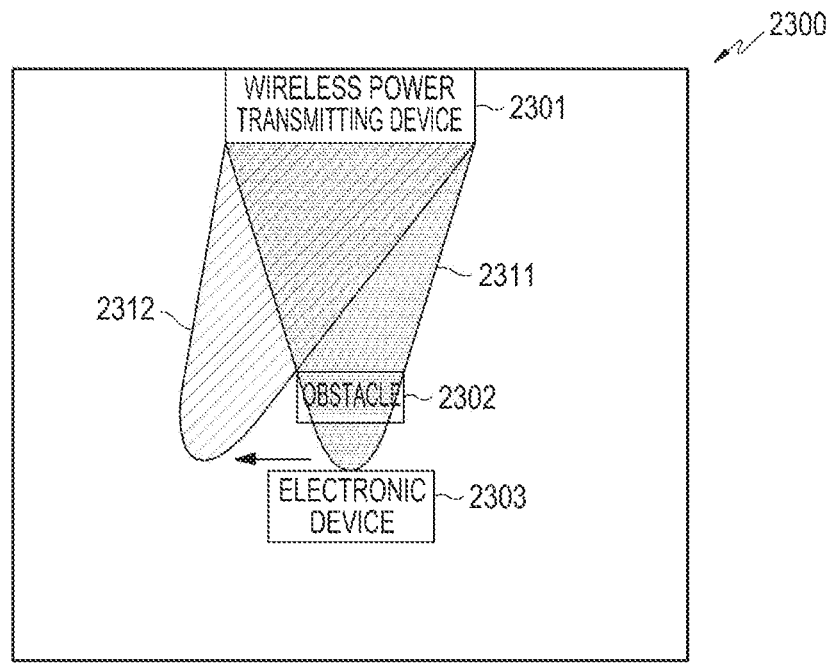
FIGS. 23A and 23B are plan views illustrating an area including a wireless power transmitting device according to an example embodiment of the present disclosure.
Figure 23B:
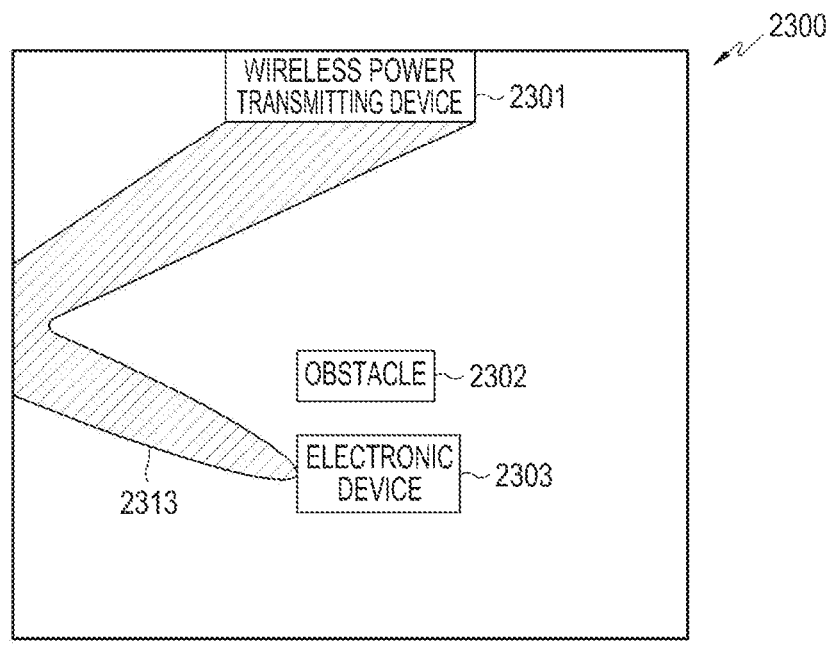

FIG. 22 is a flowchart illustrating an example method for forming a RF wave through an avoidance path according to an example embodiment of the present disclosure. The embodiment of FIG. 22 is described in greater detail with reference to FIGS. 23A and 23B. FIGS. 23A and 23B are plan views illustrating an area including a wireless power transmitting device according to an example embodiment of the present disclosure.

In operation 2210, as illustrated in FIG. 23A, the wireless power transmitting device 2301 may determine the direction in which the electronic device 2303 is positioned. For example, the wireless power transmitting device 2301 may send out a pilot signal 2311 during a detection period and receive a reflection of the pilot signal 2311 on the electronic device 2303. The wireless power transmitting device 2301 may determine the direction in which the electronic device 2303 is positioned based on a difference between the reference information and the characteristic of the reflected signal. Meanwhile, the wireless power transmitting device 2301 may store, as reference information, the signal characteristic of the reflected signal of the pilot signal for the direction of the obstacle 2302.

In operation 2220, the wireless power transmitting device 2301 may determine that there is an obstacle 2302 between the electronic device 2303 and the wireless power transmitting device 2301. When a difference between the direction 2303 in which the electronic device 2303 is positioned and the direction in which the obstacle 2302 is positioned is less than a preset threshold, the wireless power transmitting device 2301 may determine that the obstacle 2302 is present between the electronic device 2303 and the wireless power transmitting device 2301.

In operation 2230, the wireless power transmitting device 2301 may form a RF wave in a direction different from the existing path. For example, as illustrated in FIG. 23A, the wireless power transmitting device 2301 may vary the direction of formation of the RF wave 2312. The wireless power transmitting device 2301 may vary the direction of formation of the RF wave by adjusting at least one of the phase and amplitude of each of the plurality of phase and amplitudes. According to an embodiment of the present disclosure, the wireless power transmitting device 2301 may vary the direction of formation of the RF wave 2312 to a preset direction. For example, the wireless power transmitting device 2301 may be configured to move the direction of formation of RF wave by two direction units.

In operation 2240, the wireless power transmitting device 2301 may receive RX power-related information from the electronic device 2303. Further, the wireless power transmitting device 2301 may determine whether the received power-related information meets a preset condition. For example, the wireless power transmitting device 2301 may determine whether the voltage at the output end of the rectifier in the electronic device 2303 exceeds a preset threshold.

Upon determining that the received power-related information meets a preset threshold, the wireless power transmitting device 2301 may continue forming the RF wave in operation 2250. Unless the received power-related information is determined to meet the preset condition, the wireless power transmitting device 2301 may form a RF wave in a direction different from the existing path. For example, as illustrated in FIG. 23B, the wireless power transmitting device 2301 may re-adjust the direction of formation of the RF wave 2313. In this case, the RF wave 2313 may be reflected by a wall and delivered to the electronic device 2303. Accordingly, the wireless power transmitting device 2301 may charge the electronic device 2303 without influence from the obstacle 2302. In this case, the received power-related information of the electronic device 2303 may meet the preset condition. The wireless power transmitting device 2301 may receive the received power-related information from the electronic device 2303. The received power-related information may meet the preset condition. The wireless power transmitting device 2301 may keep on forming the RF wave 2313 corresponding to the meeting of the preset condition. Further, the wireless power transmitting device 2301 may store an avoidance path corresponding to the position of the electronic device 2303, e.g., a condition for forming the RF wave 2313. Accordingly, where another electronic device is detected later at the position of the electronic device 2303, the wireless power transmitting device 2301 may immediately form a RF wave 2303 without an additional procedure.

Figure 24A:
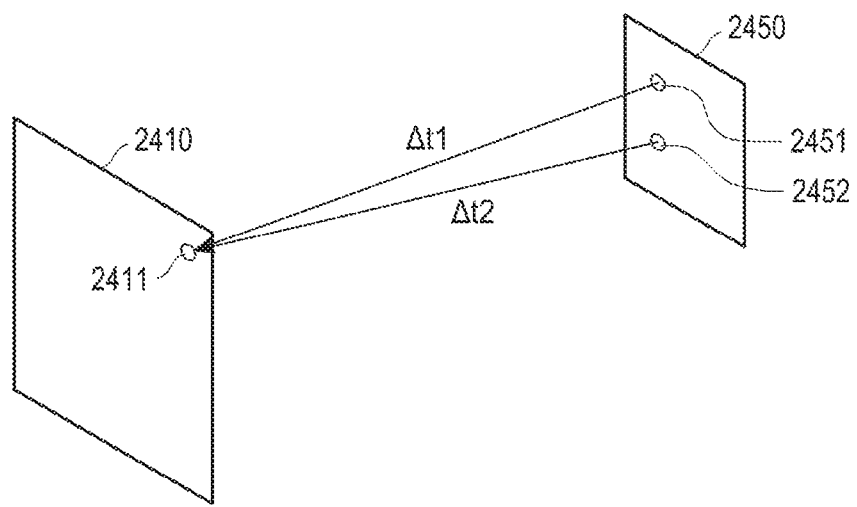
FIGS. 24A and 24B are concept views illustrating an example method for detecting an obstacle according to an example embodiment of the present disclosure.
Figure 24B:
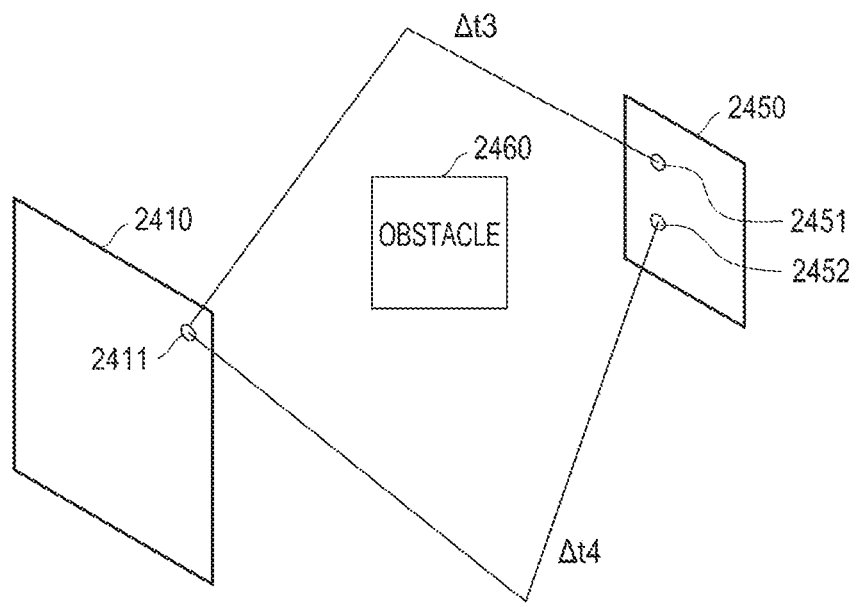

FIGS. 24A and 24b are diagrams illustrating an example method for detecting an obstacle. The wireless power transmitting device 2410 may include a communication antenna 2411. The electronic device 2450 may include a plurality of communication antennas 2451 and 2452. A first time $\Delta t1$ may be required until a first communication signal sent out by the communication antenna 2451 is received by the communication antenna 2411. A second time Δt2 may be required until a second communication signal sent out by the communication antenna 2452 is received by the communication antenna 2411. Unless an obstacle is positioned between the electronic device 2450 and the wireless power transmitting device 2410, a difference between the first time Δt1 and the second time Δt2 is of less significance. On the other hand, an obstacle 2460 may be positioned between the wireless power transmitting device 2410 and the electronic device 2450 as illustrated in FIG. 24B. In such case, communication signals may be received by the communication antenna 2411 by getting around the obstacle 2460. Thus, a third time Δt3 may be required until the first communication signal sent out by the communication antenna 2451 is received by the communication antenna 2411. A fourth time Δt4 may be required until the second communication signal sent out by the communication antenna 2452 is received by the communication antenna 2411. In this case, a difference between the third time Δt3 and the fourth time Δt4 may be relatively large. This is attributed to a difference in path between the first communication signal and the second communication signal. As a result, upon determining that a gap in time of reception between the first communication signal and the second communication signal is larger than a preset threshold, the wireless power transmitting device 2410 may determine that the obstacle 2460 is positioned between the electronic device 2450 and the wireless power transmitting device 2410.

Figure 25:
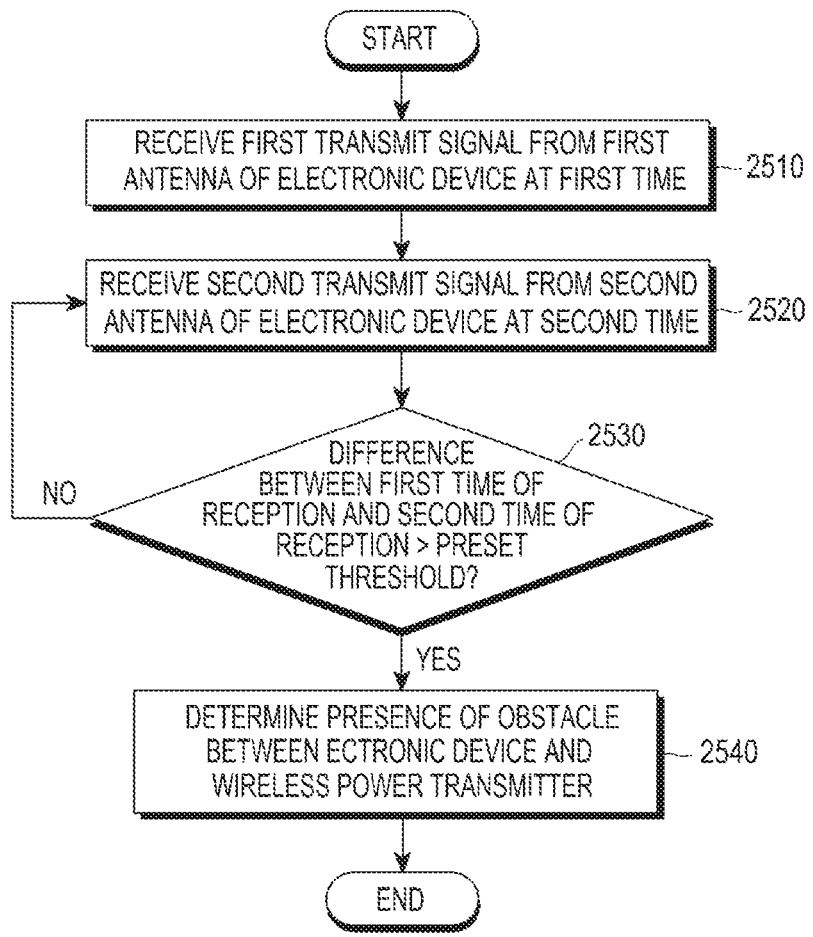
FIG. 25 is a flowchart illustrating an example method for detecting an obstacle according to an example embodiment of the present disclosure.

FIG. 25 is a flowchart illustrating an example method for detecting an obstacle according to an example embodiment of the present disclosure.

In operation 2510, the wireless power transmitting device may receive a first transmit signal from a first antenna of the electronic device at a first time. In operation 2520, the wireless power transmitting device may receive a second transmit signal from a second antenna of the electronic device at a second time. According to an embodiment of the present disclosure, the electronic device may be configured to first send out the first transmit signal through the first antenna, and a preset time after, the second transmit signal through the second antenna. The wireless power transmitting device may previously store the preset time. The first transmit signal and the second transmit signal, respectively, may include identification information indicating that they, respectively, have been sent out from the first antenna and the second antenna.

In operation 2530, the wireless power transmitting device may determine whether a difference between the first time of reception and the second time of reception exceeds a preset threshold. As described in connection with FIGS. 24A and 24B, where no obstacle is present, the difference between the first time of reception and the second time of reception might be of little difference from the preset time. In other words, when no obstacle is present, the first transmit signal and the second transmit signal may be received substantially at the same time. The preset threshold may be set to be a value obtained by adding, to the preset time, a value allowing the first transmit signal and the second transmit signal to be determined to have been received substantially at the same time.

Upon determining that the difference between the first time of reception and the second time of reception is in excess of the preset threshold, the wireless power transmitting device, in operation 2540, may determine that an obstacle is positioned between the electronic device and the wireless power transmitting device. Upon determining that the difference between the first time of reception and the second time of reception is not in excess of the preset threshold, the wireless power transmitting device may determine that no obstacle is positioned between the electronic device and the wireless power transmitting device.

Meanwhile, according to an example embodiment of the present disclosure, the wireless power transmitting device may also determine the presence or absence of an obstacle by determining the time of flight (TOF) of each communication signal. According to an embodiment of the present disclosure, the communication signal may include a time stamp for the time of transmission. Accordingly, a first communication signal may include a time stamp for the time of transmission of the first communication signal, and the second communication signal may include a time stamp for the time of transmission of the second communication signal. The wireless power transmitting device may compare the time of reception with the time of transmission of the first communication signal to determine a first time of flight of the first communication signal, and the wireless power transmitting device may compare the time of reception with the time of transmission of the second communication signal to determine a second time of flight of the second communication signal. As set forth above in connection with FIGS. 24A and 24B, where no obstacle is present, the first time of flight may be substantially the same as the second time of flight. Accordingly, the wireless power transmitting device may determine whether there is an obstacle using a difference between the first time of flight and the second time of flight.

Figure 26:
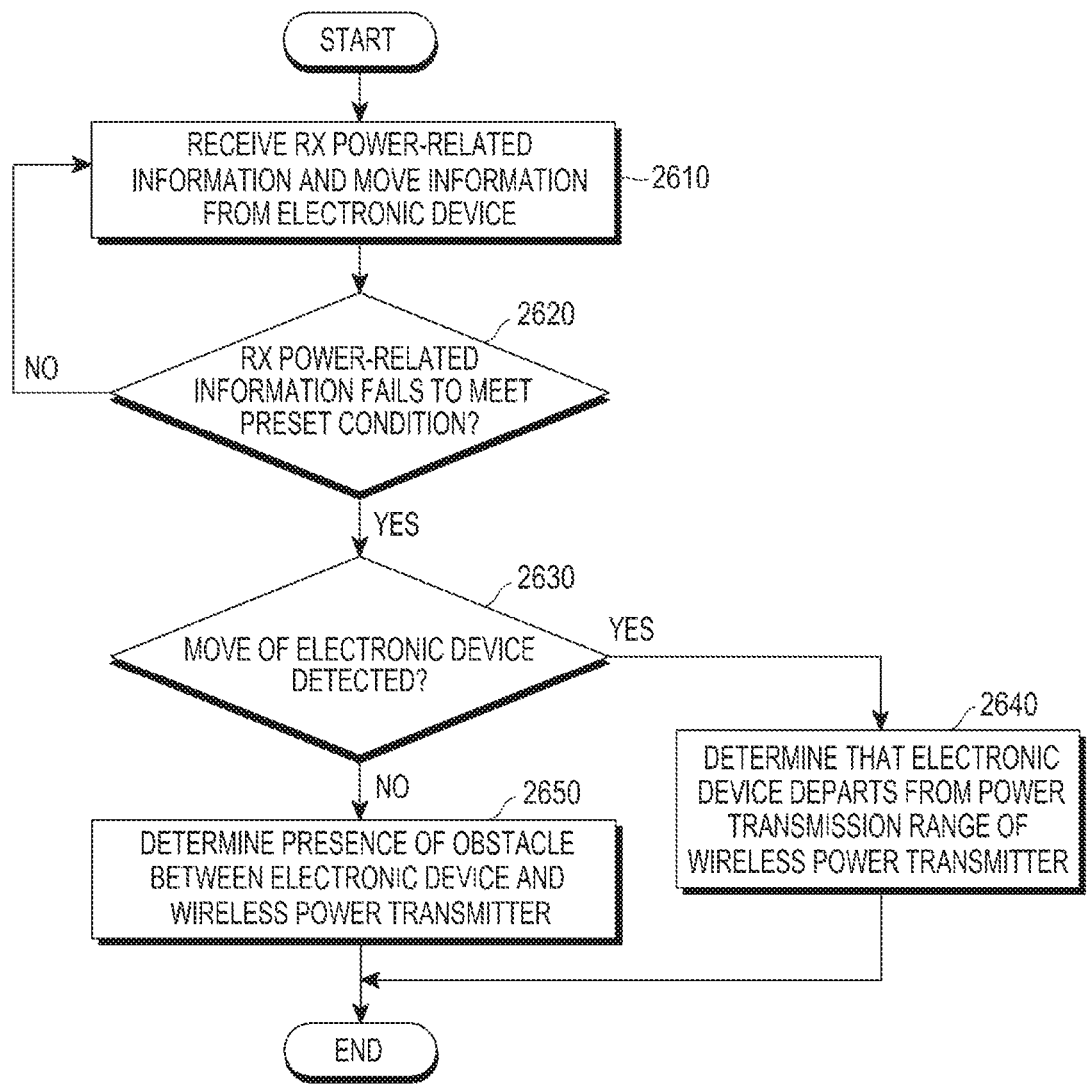
FIG. 26 is a flowchart illustrating an example method for controlling a wireless power transmitting device according to an example embodiment of the present disclosure.

FIG. 26 is a flowchart illustrating an example method for controlling a wireless power transmitting device according to an example embodiment of the present disclosure.

In operation 2610, the wireless power transmitting device may receive RX power-related information and move information from the electronic device. In operation 2620, the wireless power transmitting device may determine whether the received RX power-related information meets a preset condition. For example, the wireless power transmitting device may detect that the voltage at the output end of the rectifier in the electronic device is not more than a preset threshold. In other words, the preset condition may be a condition indicating that the electronic device fails to receive a sufficient amount of power.

In operation 2630, the wireless power transmitting device may determine whether a move of the electronic device is detected. Upon determining that the electronic device has moved, the wireless power transmitting device, in operation 2640, may determine that the electronic device has departed from a power transmission range of the wireless power transmitting device. Upon determining that the electronic device has departed from the power transmission range, the wireless power transmitting device may initiate a process for discovering the position of the electronic device.

When determining that the electronic device has not moved, the wireless power transmitting device, in operation 2650, may determine that an obstacle is present between the electronic device and the wireless power transmitting device.

According to an example embodiment of the present disclosure, there is provided a storage medium storing commands configured to be executed by at least one processor to enable the at least one processor to perform at least one operation that may comprise storing, as reference information, information about a first reflected signal of a pilot signal sent out at a first time, sending out a pilot signal at a second time, and comparing the reference information with information about second reflected signals of the pilot signal sent out at the second time; and determining a position of a target for detection based on a result of the comparison.

According to an embodiment of the present disclosure, there is provided a storage medium storing commands configured to be executed by at least one processor to enable the at least one processor to perform at least one operation that may comprise receiving a first communication signal from a first antenna of an electronic device, receiving a second communication signal from a second antenna of the electronic device, determining whether an obstacle is positioned between the electronic device and the wireless power transmitting device using a first time of reception of the first communication signal and a second time of reception of the second communication signal, and upon determining that the obstacle is positioned between the electronic device and the wireless power transmitting device, transmitting power to the electronic device while avoiding the obstacle.

The above-described commands may be stored in an external server and may be downloaded and installed on an electronic device, such as a wireless power transmitting device. In other words, according to an example embodiment of the present disclosure, the external server may store commands that are downloadable by the wireless power transmitting device.

As is apparent from the foregoing description, according to various example embodiments of the present disclosure, there may be provided a wireless power transmitting device capable of swiftly determining the position of an electronic device by sending out pilot signals in multiple directions and analyzing reflections thereof and a method for controlling the same. There are also provided a wireless power transmitting device capable of conducting wireless charging by avoiding obstacles positioned between an electronic device and the wireless power transmitting device and a method for controlling the same.

The various example embodiments disclosed herein are provided for description and understanding of the disclosed technology and does not limit the scope of the present disclosure. Accordingly, the scope of the present disclosure should be understood as including all changes or various embodiments based on the technical spirit of the present disclosure.

What is claimed is:

1. A wireless power transmitting device, comprising:
a plurality of antennas;
a communication circuit; and
a processor configured to:
  transmit a plurality of first pilot signals through the plurality of antennas towards a plurality of first directions respectively,
  receive a plurality of first reflected signals from a plurality of second directions respectively, wherein each of the plurality of first reflected signals is generated according to reflection of each of the plurality of first pilot signals,
  identify a first object and a direction of the first object based on the received plurality of first reflected signals,
  receive, by using the communication circuit, a first communication signal responsive to at least one of the plurality of first pilot signals, from the first object, and identify that the first object is a first wireless power receiving device based on the first communication signal, and
  based on identifying that the first object is the first wireless power receiving device, control the wireless power transmitting device to transmit a charging power through the plurality of antennas towards the direction of the first object identified based on the received plurality of first reflected signals.

2. The wireless power transmitting device of claim 1, wherein the first communication signal includes identification information of the first wireless power receiving device.

3. The wireless power transmitting device of claim 1, wherein the processor is further configured to:
identify a plurality of objects including the first object based on the received plurality of first reflected signals, and
identify whether each of the plurality of objects is a wireless power receiving device or an obstacle according to whether a communication signal is received from each of the plurality of objects.

4. The wireless power transmitting device of claim 1, wherein the processor is further configured to:
after controlling the wireless power transmitting device to transmit the charging power, receive, by using the communication circuit, a second communication signal from the first object, wherein the second communication signal includes information on at least one of a voltage value, a current value, or a power value of the transmitted charging power detected by the first object.

5. The wireless power transmitting device of claim 4, wherein the processor is further configured to:
identify whether at least one of the voltage value, the current value, or the power value exceeds a preset value, and
based on identifying that at least one of the voltage value, the current value, or the power value does not exceed the preset value, control the wireless power transmitting device to transmit the charging power towards a direction different from the direction of the first object.

6. The wireless power transmitting device of claim 5, wherein the processor is further configured to:
identify a plurality of directions of a plurality of objects respectively, including the first object, based on the received plurality of first reflected signals, and
determine the direction different from the direction of the first object based on the identified plurality of directions of the plurality of objects respectively so that the at least one of the voltage value, the current value, or the power value exceeds the preset value.

7. The wireless power transmitting device of claim 5, wherein the processor is further configured to:
control the wireless power transmitting device to transmit the charging power in the direction different from the direction of the first object by adjusting at least one of an amplitude or a phase of waves generated through the plurality of antennas.

8. The wireless power transmitting device of claim 4, wherein the processor is further configured to:
identify whether at least one of the voltage value, the current value, or the power value exceeds a preset value, and
based on identifying that at least one of the voltage value, the current value, or the power value does not exceed the preset value, determine a strength of the charging power to be transmitted and control the wireless power transmitting device to transmit the power having the determined strength.

9. The wireless power transmitting device of claim 1, further comprising a memory,
wherein the processor is configured to:
store, in the memory, reference information on a plurality of second reflected signals of a plurality of second pilot signals transmitted at a first time point,
compare the reference information with information on the received plurality of first reflected signals of the plurality of first pilot signals transmitted at a second time point different from the first time point, and
identify a plurality of directions of a plurality of objects respectively based on a result of the comparison.

10. The wireless power transmitting device of claim 1, wherein each of the plurality of first pilot signals is configured to cause a wireless power receiving device to transmit the first communication signal in response to receiving each of the plurality of the first pilot signals.

11. A method of controlling a wireless power transmitting device, comprising:
transmitting a plurality of first pilot signals through a plurality of antennas of the wireless power transmitting device towards a plurality of first directions respectively;
receiving a plurality of first reflected signals from a plurality of second directions respectively, wherein each of the plurality of first reflected signals is generated according to reflection of each of the plurality of first pilot signals;
identifying a first object and a direction of the first object based on the received plurality of first reflected signals;
receiving a first communication signal responsive to at least one of the plurality of first pilot signals, from the first object, and identifying that the first object is a first wireless power receiving device based on the first communication signal; and
based on identifying that the first object is the first wireless power receiving device, controlling the wireless power transmitting device to transmit a charging power through the plurality of antennas towards the direction of the first object identified based on the received plurality of first reflected signals.

12. The method of claim 11,
wherein the first communication signal includes identification information of the first wireless power receiving device.

13. The method of claim 11, further comprising:
identifying a plurality of objects including the first object based on the received plurality of first reflected signals; and
identifying whether each of the plurality of objects is a wireless power receiving device or an obstacle according to whether a communication signal is received from each of the plurality of objects.

14. The method of claim 11, further comprising:
after controlling the wireless power transmitting device to transmit the charging power, receiving a second communication signal from the first object, wherein the second communication signal includes information on at least one of a voltage value, a current value, or a power value of the transmitted charging power detected by the first object.

15. The method of claim 14, further comprising:
identifying whether at least one of the voltage value, the current value, or the power value exceeds a preset value; and
based on identifying that at least one of the voltage value, the current value, or the power value does not exceed the preset value, controlling the wireless power transmitting device to transmit the charging power towards a direction different from the direction of the first object.

16. The method of claim 15, further comprising
identifying a plurality of directions of a plurality of objects respectively, including the first object, based on the received plurality of first reflected signals; and
determining the direction different from the direction of the first object based on the identified plurality of directions of the plurality of objects respectively so that the at least one of the voltage value, the current value, or the power value exceeds the preset value.

17. The method of claim 15, further comprising:
controlling the wireless power transmitting device to transmit the charging power in the direction different from the direction of the first object by adjusting at least one of an amplitude or a phase of waves generated through the plurality of antennas.

18. The method of claim 14, further comprising:
identifying whether at least one of the voltage value, the current value, or the power value exceeds a preset value; and
based on identifying that at least one of the voltage value, the current value, or the power value does not exceed the preset value, determining a strength of the charging power to be transmitted and controlling the wireless power transmitting device to transmit the power having the determined strength.

19. The method of claim 11, further comprising:
storing, in a memory of the wireless power transmitting device, reference information on a plurality of second reflected signals of a plurality of second pilot signals transmitted at a first time point;
comparing the reference information with information on the received plurality of first reflected signals of the plurality of first pilot signals transmitted at a second time point different from the first time point; and
identifying the plurality of directions of a plurality of objects respectively based on a result of the comparison.

20. A non-transitory computer-readable storage medium storing commands, the commands configured to be executed by at least one processor to cause the at least one processor to perform at least one operation, the at least one operation comprising:
transmitting a plurality of first pilot signals through a plurality of antennas of the wireless power transmitting device towards a plurality of first directions respectively;
receiving a plurality of first reflected signals from a plurality of second directions respectively, wherein each of the plurality of first reflected signals is generated according to reflection of each of the plurality of first pilot signals;
identifying a first object and a direction of the first object based on the received plurality of first reflected signals;
receiving a first communication signal responsive to at least one of the plurality of first pilot signals, from the first object, and identifying that the communication signal indicates that the first object is a first wireless power receiving device based on the first communication signal; and
based on identifying that the first object is the first wireless power receiving device, controlling the wireless power transmitting device to transmit a charging power through the plurality of antennas towards the direction of the first object identified based on the received plurality of first reflect signals.

* * * * *